US012108305B2

(12) United States Patent
Gummadi et al.

(10) Patent No.: US 12,108,305 B2
(45) Date of Patent: Oct. 1, 2024

(54) SYSTEM AND METHODS FOR POWER EFFICIENT POSITIONING OF A MOBILE DEVICE

(71) Applicant: QUALCOMM Incorporated, San Diego, CA (US)

(72) Inventors: Bapineedu Chowdary Gummadi, Hyderabad (IN); Avinash Shrivastava, Hyderabad (IN); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/477,228

(22) Filed: Sep. 16, 2021

(65) Prior Publication Data
US 2022/0103976 A1    Mar. 31, 2022

Related U.S. Application Data

(60) Provisional application No. 63/085,045, filed on Sep. 29, 2020.

(51) Int. Cl.
*H04W 4/029* (2018.01)
*G01S 5/00* (2006.01)
(Continued)

(52) U.S. Cl.
CPC .......... *H04W 4/029* (2018.02); *G01S 5/0036* (2013.01); *H04W 24/10* (2013.01); *H04W 76/19* (2018.02)

(58) Field of Classification Search
CPC . H04W 4/029; H04W 24/10; H04W 52/0209; H04W 52/0216; H04W 64/00; H04W 76/19; H04W 76/27; G01S 5/0036
See application file for complete search history.

(56) References Cited

U.S. PATENT DOCUMENTS

| 6,725,048 B2 | 4/2004 | Mao et al. |
| 6,985,747 B2 | 1/2006 | Chithambaram |

(Continued)

FOREIGN PATENT DOCUMENTS

| CN | 101455096 A | 6/2009 |
| CN | 101493513 A | 7/2009 |

(Continued)

OTHER PUBLICATIONS

Liping S., "Analysis of LTE Technology-Based Internet of Things Technology", Silicon Valley Issue 8, Apr. 23, 2013, 3 Pages.

(Continued)

*Primary Examiner* — Jean A Gelin
(74) *Attorney, Agent, or Firm* — Weaver Austin Villenueve & Sampson LLP

(57) ABSTRACT

During a positioning session between a user equipment (UE) and a location server, the location server may send the base station a request to suspend the Radio Resource Control (RRC) connection with the UE. For example, the location server may send a request to the base station recommending suspension of the connection or may provide an indication of the amount of time during which position related messages between the UE and the location server are not expected. The base station may determine whether to suspend the connection with the UE, thereby placing the UE in an inactive state based on the information provided. The base station may further determine whether to suspend the connection based on data activity of the UE. While in an inactive state, the UE and base station store UE connection context, which may be used to quickly resume the connection.

37 Claims, 10 Drawing Sheets

(51) Int. Cl.
*H04W 24/10* (2009.01)
*H04W 76/19* (2018.01)

(56) References Cited

U.S. PATENT DOCUMENTS

| | | | |
|---|---|---|---|
| 7,209,757 B2 | 4/2007 | Naghian et al. | |
| 7,254,388 B2 | 8/2007 | Nam et al. | |
| 7,321,773 B2 | 1/2008 | Hines et al. | |
| 7,509,132 B2 | 3/2009 | Duan et al. | |
| 7,660,590 B2 | 2/2010 | Timiri et al. | |
| 7,764,961 B2 | 7/2010 | Zhu et al. | |
| 7,778,648 B2 | 8/2010 | Ge et al. | |
| 7,860,517 B1 | 12/2010 | Patoskie et al. | |
| 7,974,639 B2 | 7/2011 | Burroughs et al. | |
| 8,154,401 B1 | 4/2012 | Bertagna et al. | |
| 8,165,602 B2 | 4/2012 | Kim et al. | |
| 8,195,195 B2 | 6/2012 | Kim et al. | |
| 8,504,060 B2 | 8/2013 | Harindranath | |
| 8,526,945 B2 | 9/2013 | Knauft et al. | |
| 8,780,732 B2 | 7/2014 | Song et al. | |
| 9,125,018 B2 | 9/2015 | Wachter et al. | |
| 9,191,520 B2 | 11/2015 | Titus et al. | |
| 9,220,028 B2 | 12/2015 | Suzuki et al. | |
| 9,264,928 B2 | 2/2016 | Liu et al. | |
| 9,326,096 B1 | 4/2016 | Gatmir-Motahari et al. | |
| 9,591,679 B2 | 3/2017 | Bontu et al. | |
| 9,693,338 B2 | 6/2017 | Zhao et al. | |
| 9,781,259 B1 | 10/2017 | Kodaypak | |
| 9,955,373 B2 | 4/2018 | Siomina et al. | |
| 10,244,420 B2 | 3/2019 | Yamine et al. | |
| 10,341,893 B2 | 7/2019 | Siomina et al. | |
| 10,499,337 B1 | 12/2019 | Bart | |
| 10,715,951 B1 | 7/2020 | Ratasuk et al. | |
| 10,893,501 B1 | 1/2021 | Fong et al. | |
| 10,993,081 B2 | 4/2021 | Mehran et al. | |
| 11,096,036 B2 | 8/2021 | Poornachandran et al. | |
| 11,140,649 B2 | 10/2021 | Ryu et al. | |
| 11,546,848 B2 | 1/2023 | Edge | |
| 11,700,517 B2 | 7/2023 | Zhao et al. | |
| 2002/0171673 A1* | 11/2002 | Brown | G06Q 10/06 715/700 |
| 2005/0123149 A1 | 6/2005 | Elko et al. | |
| 2005/0250516 A1 | 11/2005 | Shim | |
| 2006/0223490 A1 | 10/2006 | Kim et al. | |
| 2006/0293066 A1 | 12/2006 | Edge et al. | |
| 2007/0004429 A1 | 1/2007 | Edge et al. | |
| 2007/0015522 A1 | 1/2007 | Ruutu et al. | |
| 2007/0049288 A1 | 3/2007 | Lamprecht et al. | |
| 2007/0054675 A1 | 3/2007 | Duan | |
| 2007/0185985 A1 | 8/2007 | Shim et al. | |
| 2007/0232322 A1 | 10/2007 | Jagadeesan et al. | |
| 2009/0049154 A1 | 2/2009 | Ge | |
| 2009/0054035 A1 | 2/2009 | Kim et al. | |
| 2009/0167554 A1 | 7/2009 | Munje et al. | |
| 2009/0181698 A1 | 7/2009 | Farmer et al. | |
| 2010/0041418 A1 | 2/2010 | Edge et al. | |
| 2011/0053605 A1* | 3/2011 | Carpio | H04W 64/00 455/456.1 |
| 2011/0053606 A1 | 3/2011 | Yao et al. | |
| 2011/0053613 A1 | 3/2011 | Zhou et al. | |
| 2011/0064046 A1 | 3/2011 | Zhu | |
| 2011/0096669 A1 | 4/2011 | Iovieno et al. | |
| 2011/0098048 A1 | 4/2011 | Zhang et al. | |
| 2011/0171974 A1 | 7/2011 | Kim et al. | |
| 2011/0176486 A1 | 7/2011 | Mahdi | |
| 2011/0256873 A1 | 10/2011 | Vikberg et al. | |
| 2012/0040681 A1 | 2/2012 | Yan et al. | |
| 2012/0147772 A1 | 6/2012 | Kazmi et al. | |
| 2012/0314604 A1 | 12/2012 | Siomina et al. | |
| 2013/0012232 A1 | 1/2013 | Titus et al. | |
| 2013/0027556 A1 | 1/2013 | Clark et al. | |
| 2013/0045756 A1 | 2/2013 | Busin et al. | |
| 2013/0193909 A1 | 8/2013 | Blevins | |
| 2013/0303164 A1 | 11/2013 | Seo | |
| 2013/0308481 A1* | 11/2013 | Kazmi | H04W 24/02 370/252 |
| 2013/0310068 A1 | 11/2013 | Fischer et al. | |
| 2013/0324123 A1 | 12/2013 | Ianev et al. | |
| 2014/0073347 A1* | 3/2014 | Yongjin | H04W 64/00 455/456.1 |
| 2014/0086164 A1* | 3/2014 | Kim | H04W 72/20 370/329 |
| 2014/0092877 A1* | 4/2014 | Kazmi | H04W 52/36 370/336 |
| 2014/0098690 A1 | 4/2014 | Siomina et al. | |
| 2014/0155101 A1 | 6/2014 | Wachter et al. | |
| 2014/0213269 A1* | 7/2014 | Nama | H04W 72/20 455/451 |
| 2014/0244834 A1 | 8/2014 | Guedalia et al. | |
| 2014/0248901 A1 | 9/2014 | Johnsson et al. | |
| 2014/0362754 A1 | 12/2014 | Moses et al. | |
| 2015/0011239 A1 | 1/2015 | Quan et al. | |
| 2015/0065160 A1 | 3/2015 | Meredith et al. | |
| 2015/0126235 A1 | 5/2015 | Cho et al. | |
| 2015/0189502 A1 | 7/2015 | Meredith et al. | |
| 2015/0201318 A1 | 7/2015 | Singh et al. | |
| 2015/0229713 A1 | 8/2015 | Lu et al. | |
| 2015/0230057 A1 | 8/2015 | Jiang et al. | |
| 2015/0289127 A1 | 10/2015 | Ou et al. | |
| 2015/0296379 A1 | 10/2015 | Nix | |
| 2015/0304982 A1 | 10/2015 | Liao | |
| 2015/0327032 A1 | 11/2015 | Hedman et al. | |
| 2016/0100362 A1 | 4/2016 | Palanisamy et al. | |
| 2016/0156513 A1 | 6/2016 | Zhang et al. | |
| 2016/0157056 A1 | 6/2016 | Kim et al. | |
| 2016/0205625 A1 | 7/2016 | Stojanovski et al. | |
| 2016/0227381 A1 | 8/2016 | Bargetzi et al. | |
| 2017/0150395 A1 | 5/2017 | Karlsson et al. | |
| 2017/0156055 A1 | 6/2017 | Zhang et al. | |
| 2017/0265211 A1* | 9/2017 | Elsayed | H04W 52/0216 |
| 2018/0041984 A1 | 2/2018 | Li et al. | |
| 2018/0054795 A1 | 2/2018 | Edge | |
| 2018/0054796 A1 | 2/2018 | Edge | |
| 2018/0098279 A1 | 4/2018 | Edge | |
| 2018/0249528 A1 | 8/2018 | Kuge et al. | |
| 2019/0182794 A1* | 6/2019 | Wong | H04W 52/0216 |
| 2019/0254104 A1* | 8/2019 | Gurumoorthy | H04W 76/27 |
| 2020/0154506 A1 | 5/2020 | Liu | |
| 2020/0229130 A1 | 7/2020 | Keating et al. | |
| 2020/0252902 A1 | 8/2020 | Edge | |
| 2020/0260240 A1 | 8/2020 | Lee et al. | |
| 2021/0014791 A1* | 1/2021 | Freda | H04W 52/0232 |
| 2021/0227442 A1 | 7/2021 | Yiu | |
| 2021/0266833 A1 | 8/2021 | Edge | |
| 2021/0329443 A1 | 10/2021 | Si et al. | |
| 2022/0256312 A1 | 8/2022 | Kim et al. | |
| 2022/0369069 A1 | 11/2022 | Busin et al. | |
| 2023/0133396 A1 | 5/2023 | Edge | |

FOREIGN PATENT DOCUMENTS

| | | | |
|---|---|---|---|
| CN | 101965033 A | 2/2011 | |
| CN | 102111847 A | 6/2011 | |
| CN | 102131217 A | 7/2011 | |
| CN | 102340762 A | 2/2012 | |
| CN | 102368875 A | 3/2012 | |
| CN | 102413485 A | 4/2012 | |
| CN | 102483458 A | 5/2012 | |
| CN | 102860063 A | 1/2013 | |
| CN | 103188751 A | 7/2013 | |
| CN | 103354986 A | 10/2013 | |
| CN | 103428748 A | 12/2013 | |
| CN | 103517093 A | 1/2014 | |
| CN | 103546984 A | 1/2014 | |
| CN | 103581398 A | 2/2014 | |
| CN | 103647822 A | 3/2014 | |
| CN | 103686792 A | 3/2014 | |
| CN | 103858512 A | 6/2014 | |
| CN | 104978535 A | 10/2015 | |
| CN | 110301143 * | 10/2019 | H04W 4/70 |
| CN | 109891916 B | 1/2022 | |
| EP | 2474838 A1 | 7/2012 | |
| EP | 2606691 B1 | 12/2014 | |
| EP | 3018945 A1 | 5/2016 | |

(56) References Cited

FOREIGN PATENT DOCUMENTS

| | | |
|---|---|---|
| EP | 3497991 A1 | 6/2019 |
| JP | 2001128226 A | 5/2001 |
| JP | 2018507596 A | 3/2018 |
| WO | WO-2005117295 A1 | 12/2005 |
| WO | WO-2009024002 A1 | 2/2009 |
| WO | 2010091424 A2 | 8/2010 |
| WO | WO-2011130082 A1 | 10/2011 |
| WO | WO-2012047070 A3 | 6/2012 |
| WO | WO-2012152155 A1 | 11/2012 |
| WO | WO-2013062462 A1 | 5/2013 |
| WO | WO-2013111906 A1 | 8/2013 |
| WO | WO-2014134406 A1 | 9/2014 |
| WO | WO-2014146530 A1 | 9/2014 |
| WO | WO-2014194300 A1 | 12/2014 |
| WO | WO-2016126847 A1 | 8/2016 |
| WO | WO-2017058287 A1 | 4/2017 |
| WO | WO-2018038798 A1 | 3/2018 |

OTHER PUBLICATIONS

Muyin L., et al., "Research on Internet of Things Congestion Control Solutions Based on Mobile Communication Network", China Internet Issue 9, Sep. 15, 2013, 13 Pages.
3GPP TS 23.730: 3rd Generation Partnership Project, Technical Specification Group Services and System Aspects, Study on Extended Architecture Support for Cellular Internet of Things (Release 14), V1.2.0 (Oct. 2016), 3GPP, 76 Pages, Oct. 31, 2016.
ETSI TS 123 271, "Digital Cellular Telecommunications System (Phase 2+) (GSM); Universal Mobile Telecommunications System (UMTS); LTE; Functional Stage 2 Description of Location Services (LCS) (3GPP TS 23.271 version 14.2.0 Release 14)", ETSI TS 123 271, V14.2.0, pp. 29-31, Jul. 2017, 187 Pages.
ETSI TS 123 271, "Digital Cellular Telecommunications System (Phase 2+); Universal Mobile Telecommunications System (UMTS); LTE; Functional Stage 2 Description of Location Services (LCS) (3GPP TS 23.271 version 10.4.0 Release 10)", ETSI TS 123 271, V10.4.0, pp. 27-29, Apr. 2013, 171 Pages.
ETSI TS 123 401, "LTE; General Packet Radio Service (GPRS) Enhancements for Evolved Universal Terrestrial Radio Access Network (E-UTRAN) Access (3GPP TS 23.401 version 12.6.0 Release 12)", ETSI TS 123 401, V12.6.0, pp. 135-138, Sep. 2014, 308 Pages.
Qualcomm Incorporated: "Triggered Location Information Transfer due to Cell Change", Change Request 36.355 CR 0016 rev; v.9.0.0, R2-101788, 3GPP TSG RAN WG2 Meeting #69, Feb. 22-26, 2010, San Francisco, California, USA, pp. 1-4.
3GPP TR 23.730, "3rd Generation Partnership Project; Technical Specification Group Services and System Aspects; Study on Extended Architecture Support for Cellular Internet of Things (Release 14)", 3GPP TR 23.730, V0.1.0 (Jul. 2016), Aug. 17, 2016, 27 Pages.
3GPP TR 23.730, "3rd Generation Partnership Project; Technical Specification Group Services and System Aspects; Study on Extended Architecture Support for Cellular Internet of Things (Release 14)", 3GPP TR 23.730, V0.2.0 (Sep. 2016), Sep. 16, 2016, 55 Pages.
3GPP TS 23.271: "3rd Generation Partnership Project; Technical Specification Group Services and System Aspects; Functional Stage 2 Description of Location Services (LCS) (Release 12)", 3GPP TS 23.271, V12.1.0 (Jun. 2014), pp. 1-169.
3GPP TS 23.271: "3rd Generation Partnership Project; Technical Specification Group Services and System Aspects; Functional stage 2 description of Location Services (LCS) (Release 13)", 3GPP TS 23.271, 3rd Generation Partnership Project (3GPP), Mobile Competence Centre, 650, Route Des Lucioles, F-06921, Sophia-Antipolis Cedex, France, vol. SA WG2, No. V13.0.0, Sep. 15, 2015, XP050995999, pp. 1-172.
3GPP TS 29.171, "3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLS interface (Release 13)", 3GPP TS 29.171 V13.0.0, 3rd Generation Partnership Project (3GPP), Mobile Competence Centre, 650, Route Des Lucioles, F-06921, Sophia-Antipolis Cedex, France, vol. CT WG4, No. V13.0 .0, Sep. 17, 2015, 51 pages.
Qualcomm Incorporated: "Addition of Impacts and Evaluations for Location Services Solutions", SA WG2 Meeting #117bis, 3GPP Draft; S2-166200 WAS6013 WAS5976 WAS5728 CIOT EX Evaluation of Location Enhancements for CIOT V3, 3rd Generation Partnership Project (3GPP), Mobile Competence Centre, 650, Route Des Lucioles, F-06921, Sophia-Antipolis Cedex, France, vol. SA WG2, No. Kaohsiung City, Taiwan; Oct. 24, 2016, 13 pages, Oct. 19, 2016-Oct. 23, 2016, XP051170138, Retrieved from the Internet: URL: http://www.3gpp.org/ftp/tsg_sa/WG2_Arch/TSGS2_117_Kaohsiung_City/Docs/ [retrieved on Oct. 24, 2016].
Qualcomm Incorporated: "Addition of Periodic and Triggered Location for EPC Access", 3GPP Draft, S2-166688, 3GPP TSG-SA WG2 Meeting #118, (CR 23.271—Periodic and Triggered EPC-MT-LR), 3rd Generation Partnership Project (3GPP), Mobile Competence Centre, 650, Route Des Lucioles, F-06921, Sophia-Antipolis Cedex, France, vol. SA WG2, No. Reno, Nevada, USA Nov. 8, 2016, XP051199657, Retrieved from the Internet: URL :http://www.3gpp.org/ftp/tsg_sa/WG2_Arch/TSGS2_118_Reno/Docs/ [retrieved on Nov. 8, 2016], 20 pages.
Qualcomm Incorporated: "Key Issues and Solutions for Location Support for CIoT Devices—1", SA WG2 Meeting #116bis, 3GPP Draft; S2-164846 WAS4489, 3rd Generation Partnership Project (3GPP), Mobile Competence Centre, 650, Route Des Lucioles, F-06921, Sophia-Antipolis Cedex, France, vol. SA WG2, No. Sanya, P.R. China; Sep. 3, 2016, 7 pages, Aug. 29, 2016-Sep. 2, 2016, XP051168915, Retrieved from the Internet: URL: http://www.3gpp.org/ftp/tsg_sa/WG2_Arch/TSGS2_116BIS_Sanya/Docs/ [retrieved on Sep. 3, 2016].
Qualcomm Incorporated: "Location Support for CIoT Devices", SA WG2 Meeting #116bis, 3GPP Draft; S2-164488, 3rd Generation Partnership Project (3GPP), Mobile Competence Centre, 650, Route Des Lucioles, F-06921, Sophia-Antipolis Cedex, France, vol. SA WG2, No. Sanya, P.R. China; Aug. 27, 2016, 8 pages, Aug. 29, 2016-Sep. 2, 2016, XP051130475, Retrieved from the Internet: URL: http://www.3gpp.org/ftp/Meetings_3GPP_SYNC/SA2/Docs/ [retrieved on Aug. 27, 2016].
TSG CT WG1: "CRs to Rel-7 WI "EGCS" for TSs 43.068 and 43.069", 3GPP TSG CT Meeting #28, CP-050073, (May 24, 2005), Jun. 1-3, 2005, Quebec, Canada, 1 Page.
Woqi M., "NB-IoT Opens up New Opportunities in Development of the Internet of Things Industry", Computer Knowledge and Technology, Jul. 20, 2016, 3 pages.
International Search Report and Written Opinion—PCT/US2021/050938—ISA/EPO—dated Mar. 3, 2022.
European Search Report—EP24166221—Search Authority—Munich—Apr. 16, 2024.

* cited by examiner

SYSTEM AND METHODS FOR POWER EFFICIENT POSITIONING OF A MOBILE DEVICE

CLAIM OF PRIORITY UNDER 35 U.S.C. § 119

This application claims under 35 USC § 119 the benefit of and priority to U.S. Provisional Application No. 63/085,045, filed Sep. 29, 2020, and entitled "SYSTEM AND METHODS FOR POWER EFFICIENT POSITIONING," which is assigned to the assignee hereof and is incorporated herein by reference in its entirety.

BACKGROUND OF THE DISCLOSURE

Field of the Disclosure

The present disclosure relates generally to communication, and more specifically to techniques for supporting location services for user equipments (UEs).

Relevant Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, and a fourth-generation (4G) service (e.g., LTE or WiMax). A fifth generation (5G) New Radio (NR) standard calls for higher data transfer speeds, greater numbers of connections, and better coverage, among other improvements. The 5G NR, according to the Next Generation Mobile Networks Alliance, is designed to provide data rates of several tens of megabits per second to each of tens of thousands of users, with 1 gigabit per second to tens of workers on an office floor.

For some applications, it may be useful or essential to be able to obtain a location of a mobile device through a wireless communication systems, in the absence of support from a Global Navigation Satellite System (GNSS) such as GPS, GLONASS or Galileo. For example, this may apply for a mobile device that is indoors or in a dense urban canyon when tracking of the mobile device is needed for such applications as navigation assistance, public safety support or management of moving objects in a factory or warehouse. In such cases, a non-GNSS means of reliably and quickly locating a mobile device may be of value. Power efficiency during positioning services are likewise desirable.

SUMMARY

During a positioning session between a user equipment (UE) and a location server, the location server may send the base station a request to suspend the Radio Resource Control (RRC) connection with the UE. For example, the location server may send a request to the base station recommending suspension of the connection or may provide an indication of the amount of time during which position related messages between the UE and the location server are not expected. The base station may determine whether to suspend the connection with the UE, thereby placing the UE in an inactive state based on the information provided. The base station may further determine whether to suspend the connection based on data activity of the UE. Placing the UE in an inactive state during a positioning session when no messaging is needed provides power savings. While in an inactive state, the UE and base station store UE connection context, which may be used to resume the connection quickly and efficiently, which also provides power savings, relative to releasing the connection and establishing a new connection when needed for the positioning session. In some implementations, the base station may release the connection with the UE, e.g., if the UE is in a high mobility state, which may be indicated in the request to the base station.

In one implementation, a method performed by a user equipment (UE) for supporting location services for the UE includes transmitting a message to a base station to establish a Radio Resource Control (RRC) connection with the base station; receiving a message for a positioning session from a location server; receiving a connection suspend message from the base station to place the UE in an inactive state, wherein the connection suspend message was initiated by the location server; performing positioning measurements to obtain location information while in the inactive state; and sending the location information, when in a connected state, to the location server.

In one implementation, a user equipment (UE) configured for supporting location services for the UE, includes a wireless transceiver configured to wirelessly communicate with entities in a wireless network; at least one memory; at least one processor coupled to the wireless transceiver and the at least one memory, wherein the at least one processor is configured to: transmit, via the wireless transceiver, a message to a base station to establish a Radio Resource Control (RRC) connection with the base station; receive a message for a positioning session from a location server; receive a connection suspend message from the base station to place the UE in an inactive state, wherein the connection suspend message was initiated by the location server; perform positioning measurements to obtain location information while in the inactive state; and send the location information, when in a connected state, to the location server.

In one implementation, a user equipment (UE) configured for supporting location services for the UE, includes means for transmitting a message to a base station to establish a Radio Resource Control (RRC) connection with the base station; means for receiving a message for a positioning session from a location server; means for receiving a connection suspend message from the base station to place the UE in an inactive state, wherein the connection suspend message was initiated by the location server; means for performing positioning measurements to obtain location information while in the inactive state; and means for sending the location information, when in a connected state, to the location server.

In one implementation, a non-transitory storage medium including program code stored thereon, the program code is operable to configure at least one processor in a user equipment (UE) for supporting location services for the UE, the program code comprising instructions to: transmit a message to a base station to establish a Radio Resource Control (RRC) connection with the base station; receive a message for a positioning session from a location server; receive a connection suspend message from the base station to place the UE in an inactive state, wherein the connection suspend message was initiated by the location server; perform positioning measurements to obtain location information while in the inactive state; and send the location information, when in a connected state, to the location server.

In one implementation, a method performed by a location server for supporting location services for a user equipment (UE), includes sending a message for a positioning session to the UE; sending a message to a base station that has an established Radio Resource Control (RRC) connection with the UE requesting a connection suspension for the UE to place the UE in an inactive state, wherein the base station suspends the RRC connection between the base station and the UE in response to the message; and receiving location information from the UE after the UE performs positioning measurements to obtain the location information and resumes the RRC connection with the base station.

In one implementation, a location server configured for supporting location services for a user equipment (UE) includes an external interface configured to communicate with one or more base stations, and one or more UEs; at least one memory; at least one processor coupled to the external interface and the at least one memory, wherein the at least one processor is configured to: send, via the external interface, a message for a positioning session to the UE; send, via the external interface, a message to a base station that has an established Radio Resource Control (RRC) connection with the UE requesting a connection suspension for the UE to place the UE in an inactive state, wherein the base station suspends the RRC connection between the base station and the UE in response to the message; and receive, via the external interface, location information from the UE after the UE performs positioning measurements to obtain the location information and resumes the RRC connection with the base station.

In one implementation, a location server configured for supporting location services for a user equipment (UE), includes means for sending a message for a positioning session to the UE; means for sending a message to a base station that has an established Radio Resource Control (RRC) connection with the UE requesting a connection suspension for the UE to place the UE in an inactive state, wherein the base station suspends the RRC connection between the base station and the UE in response to the message; and means for receiving location information from the UE after the UE performs positioning measurements to obtain the location information and resumes the RRC connection with the base station.

In one implementation, a non-transitory storage medium including program code stored thereon, the program code is operable to configure at least one processor in a location server for supporting location services for a user equipment (UE), the program code comprising instructions to: send a message for a positioning session to the UE; send a message to a base station that has an established Radio Resource Control (RRC) connection with the UE requesting a connection suspension for the UE to place the UE in an inactive state, wherein the base station suspends the RRC connection between the base station and the UE in response to the message; and receive location information from the UE after the UE performs positioning measurements to obtain the location information and resumes the RRC connection with the base station.

In one implementation, a method performed by a base station for supporting location services for a user equipment (UE), includes transmitting a message to the UE to establish a Radio Resource Control (RRC) connection with the UE; receiving a message from a location server requesting a connection suspension of the RRC connection between the base station and the UE while the UE is in a positioning session with the location server; determining to release the RRC connection at least partially based on the message from the location server requesting the connection suspension; and transmitting a connection suspend message to the UE to put the UE in an inactive state, wherein the UE performs positioning measurements to obtain location information while in the inactive state and sends the location information, when in a connected state, to the location server.

In one implementation, a base station configured for supporting location services for a user equipment (UE) includes an external interface configured to communicate with a location server and one or more UEs in a wireless network; at least one memory; at least one processor coupled to the external interface and the at least one memory, wherein the at least one processor is configured to: transmit, via the external interface, a message to the UE to establish a Radio Resource Control (RRC) connection with the UE; receive, via the external interface, a message from the location server requesting a connection suspension of the RRC connection between the base station and the UE while the UE is in a positioning session with a location server; determine to release the RRC connection at least partially based on the message from the location server requesting the connection suspension; and transmit, via the external interface, a connection suspend message to the UE to put the UE in an inactive state, wherein the UE performs positioning measurements to obtain location information while in the inactive state and sends the location information, when in a connected state, to the location server.

In one implementation, a base station for supporting location services for a user equipment (UE), includes means for transmitting a message to the UE to establish a Radio Resource Control (RRC) connection with the UE; means for receiving a message from a location server requesting a connection suspension of the RRC connection between the base station and the UE while the UE is in a positioning session with the location server; means for determining to release the RRC connection at least partially based on the message from the location server requesting the connection suspension; and means for transmitting a connection suspend message to the UE to put the UE in an inactive state, wherein the UE performs positioning measurements to obtain location information while in the inactive state and sends the location information, when in a connected state, to the location server.

In one implementation, a non-transitory storage medium including program code stored thereon, the program code is operable to configure at least one processor in a base station for supporting location services for a user equipment (UE), the program code comprising instructions to: transmit a message to the UE to establish a Radio Resource Control (RRC) connection with the UE; receive a message from a location server requesting a connection suspension of the RRC connection between the base station and the UE while the UE is in a positioning session with the location server; determine to release the RRC connection at least partially based on the message from the location server requesting the connection suspension; and transmit a connection suspend message to put the UE in an inactive state, wherein the UE performs positioning measurements to obtain location information while in the inactive state and sends the location information, when in a connected state, to the location server.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
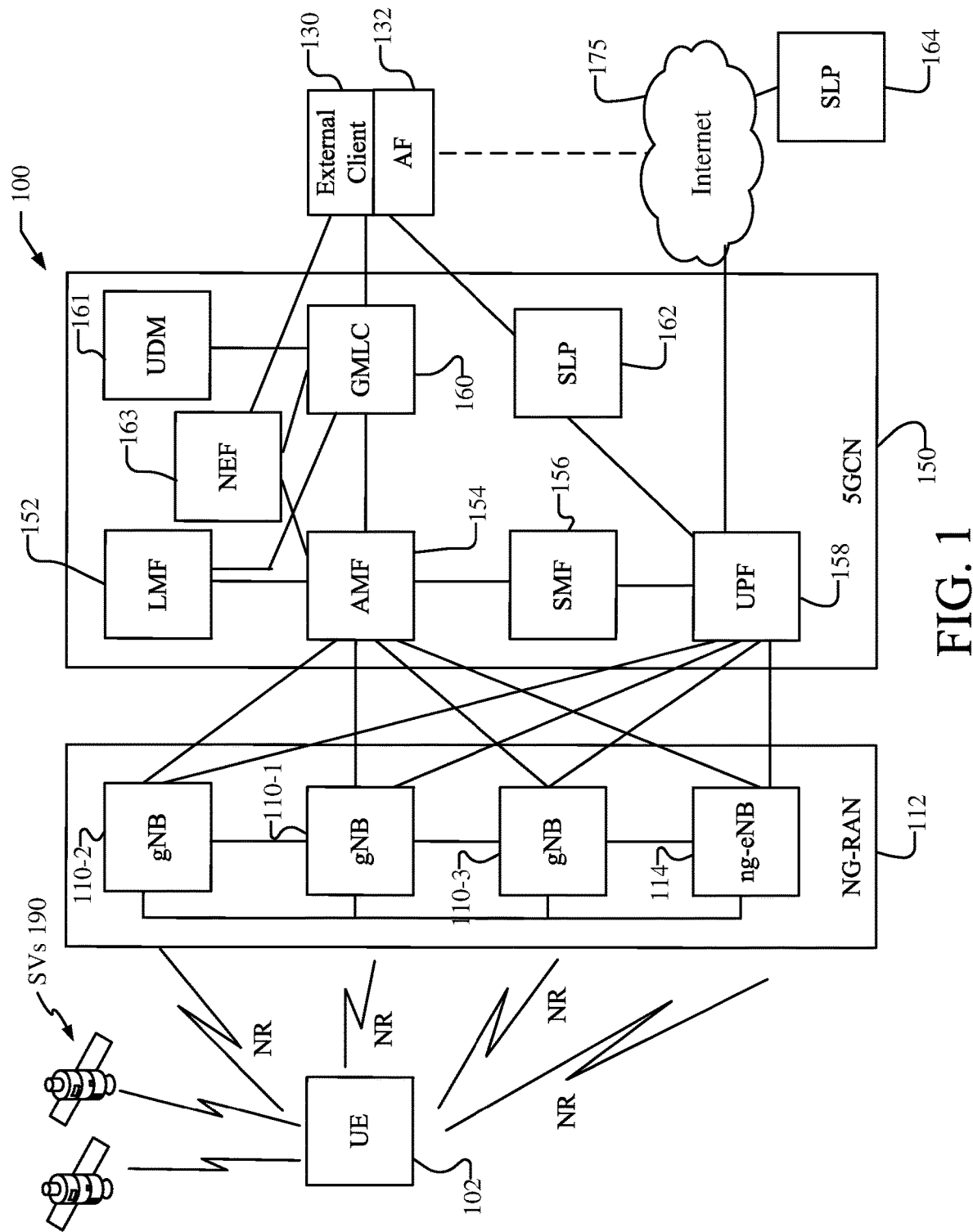
FIG. 1 illustrates a high-level system architecture of a wireless communications system in accordance with an aspect of the disclosure.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 110-1, 110-2, 110-3 of a base station are shown in FIG. 1. A reference to a base station 110 then refers to any of base stations 110-1, 110-2, 110-3.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, consumer tracking device for tracking consumer items, packages, assets, or entities such as individuals and pets, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The LS may be part of or accessible from a serving network or a home network for a UE or may simply be accessible over the Internet or over a local Intranet. If positioning of a UE is needed, an LS may instigate a session (e.g. a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g. if requested by the UE or in the absence of a request) and may request a location estimate or location measurements from a UE, e.g. for the GNSS, TDOA, AOD, Multi-RTT, and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AOD, Multi-RTT, etc.).

In a UE assisted mode of operation, a UE may return location measurements to an LS which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AOD, Multi-RTT, etc.).

In another standalone mode of operation, a UE may make location related measurements without any positioning assistance data from an LS and may further compute a location or a change in location without any positioning assistance data from an LS. Position methods that may be used in a standalone mode include GPS and GNSS (e.g. if a UE obtains satellite orbital data from data broadcast by GPS and GNSS satellites themselves) as well as sensors.

In the case of 3GPP CP location, an LS may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, an LS may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, an LS and UE may exchange messages defined according to some positioning protocol in order to coordinate the determination of an estimated location. Possible positioning protocols may include, for example, the LTE Positioning Protocol (LPP) defined by 3GPP in 3GPP TS 37.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message An LS and a base station (e.g. an eNodeB for LTE access or a gNodeB for NR access) may exchange messages to enable the LS to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and an LS that is an E-SMLC. In the case of NR access, the New Radio Position Protocol A (NRPPa) protocol may be used to transfer such messages between a base station that is a gNodeB and an LS that is an LMF.

During a positioning session, the UE may send positioning measurements to the location server infrequently. For example, the location server might not request frequent positioning measurements, e.g., a periodic trigger for positioning measurements may have a long period. In another example, there may be a relatively long period between receipt of assistance data or a request for positioning measurements and the time when positioning information is sent. The base station, e.g., the gNB, may not be aware of the timing of the positioning measurements instruction to the UE from the location server and/or when the positioning measurements will be prepared or sent by the UE since the positioning related messages between the location server and the UE can pass through the base station transparently as LPP messages.

A connection (e.g. an RRC Connection) between the UE and the base station may be released only by the base station. Without information related to the timing of the positioning measurements, the base station may not release the connection with the UE and, according, the UE may remain in a connected state with the base station during the entire positioning measurement session, which may result in additional resource and power consumption by the UE. Moreover, even if the base station releases the connection with the UE, if a positioning measurement is sent by the UE immediately after the release of the connection, a new connection will need to be initiated, which will consume additional power and time.

For example, a GNSS fix may take more than 15 seconds, for E911 or other position tracking applications. Remaining in a connected state with a base station during such an extended period may result in extra power consumption.

In one implementation, as discussed herein, a base station may receive a message from the UE or the location server for suspension of an RRC connection between the UE and the base station. For example, the location server or, in some implementations, the UE may send a request to the base station recommending suspension of the RRC connection or providing an indication of an amount of time during which position related messages between the UE and the location server are not expected to be transferred. The base station may determine whether to suspend the RRC connection with the UE based on the request or information provided in the request. The base station may further determine whether to suspend the RRC connection based on data activity for the UE. The base station, for example, may determine to suspend the RRC connection with the UE and may send an RRC Release message to the UE (also referred to herein as a Suspend message) with an indication that the RRC Connection is suspended, to put the UE in an RRC inactive state (also referred to here as an inactive mode or inactive state). While in inactive mode, the UE and the base station store UE connection context, so that the connection may be resumed quickly based on the stored UE connection context using little power consumption relative to a regular connection release and reestablishment. In some implementations, the UE or location server may determine that the UE is moving and that it is likely that a RAN update, e.g., handoff to another base station, may occur before the next positioning message is expected. The location server or UE may include an indication of movement of the UE in the request and may request that the UE be released to place the UE in an idle state during the positioning sessions. The base station may determine whether to release the RRC connection with the UE based on the request or information provided in the request, as well as additional information, such as the data activity of the UE.

FIG. 1 shows an architecture based on a non-roaming 5G NR network to support UE positioning using suspension of RRC connections per UE or location server requests as discussed herein. FIG. 1 illustrates a communication system 100 that comprises a UE 102, which is sometimes referred to herein as a "target UE", since UE 102 may be the target of a location request. FIG. 1 also shows components of a Fifth Generation (5G) network comprising a Next Generation Radio Access Network (NG-RAN) 112, which includes base stations (BSs) sometimes referred to as New Radio (NR) NodeBs or gNBs 110-1, 110-2, 110-3, and a next-generation evolved NodeB (ng-eNB) 114, and a 5G Core Network (5GCN) 150 that is in communication with an external client 130. The architecture of a gNB 110 may be split into functional parts, e.g., including one or more of a gNB Central Unit (gNB-CU), one or more gNB Distributed Units (gNB-DUs), and one or more gNB Remote Units (gNB-RUs), any of which may be physically co-located or may be physically separate from other parts of the gNB 110. A 5G network may also be referred to as a New Radio (NR) network; NG-RAN 112 may be referred to as an NR RAN or a 5G RAN; and 5GCN 150 may be referred to as a Next Generation (NG) Core network (NGC). The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

FIG. 1 shows a serving gNB 110-1 for the target UE 102 and neighbor gNBs 110-2, 110-3, and ng-eNB 114. A neighbor gNB may be any gNB which is able to receive and measure uplink (UL) signals transmitted by the target UE 102 and/or is able to transmit a downlink (DL) reference signal (RS), e.g., positioning reference signals (PRS), that can be received and measured by the target UE 102.

Entities in the NG-RAN 112 which transmit DL reference signals (RSs) to be measured by a target UE 102 for a particular location session are referred to generically as "Transmission Points" (TPs) and can include one or more of the serving gNB 110-1, and neighbor gNBs 110-2, 110-3, and ng-eNB 114.

Entities in the NG-RAN 112 which receive and measure UL signals (e.g. an RS) transmitted by a target UE 102 for a particular location session are referred to generically as "Reception Points" (RPs) and can include one or more of the serving gNB 110-1, and neighbor gNBs 110-2, 110-3, and ng-eNB 114.

It should be noted that FIG. 1 provides only a generalized illustration of various components, any or all of which may be utilized as appropriate, and each of which may be duplicated or omitted, as necessary. Specifically, although only one UE 102 is illustrated, it will be understood that many UEs (e.g., hundreds, thousands, millions, etc.) may utilize the communication system 100. Similarly, the communication system 100 may include a larger or smaller number of SVs 190, gNBs 110-1-110-2, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), also referred to as 4G, and IEEE 802.11 WiFi etc. For example, where a Wireless Local Area Network (WLAN), e.g., IEEE 802.11 radio interface, is used, the UE 102 may communicate with an Access Network (AN), as opposed to an NG-RAN, and accordingly, component 112 is sometimes referred to herein as an AN or as a RAN, denoted by the term "RAN", "(R)AN" or "(R)AN 112". In the case of an AN (e.g. IEEE 802.11 AN), the AN may be connected to a Non-3GPP Interworking Function (N3IWF) (e.g. in 5GCN 150) (not shown in FIG. 1), with the N3IWF connected to AMF 154.

The target UE 102, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. The target UE 102 may be a stand-alone device or may be embedded in another device, e.g., a factory tool, that is to be monitored or tracked. Moreover, UE 102 may correspond to a smart watch, digital glasses, fitness monitor, smart car, smart appliance, cellphone, smartphone, laptop, tablet, PDA, consumer tracking device for tracking consumer items, packages, assets, or entities such as individuals and pets, control device or some other portable or moveable device. The UE 102 may include a single entity or may include multiple entities such as in a personal area network where a user may employ audio, video and/or data I/O devices and/or body sensors and a separate wireline or wireless modem. Typically, though not necessarily, the UE 102 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GCN 150), etc. The UE 102 may also support wireless communication using a Wireless Local Area Network (WLAN) which may connect to other networks (e.g. the Internet) using a Digital Subscriber Line (DSL) or packet cable for example. The use of one or more of these RATs may allow the UE 102 to communicate with an external client 130 (e.g. via elements of 5GCN 150 not shown in FIG. 1, or possibly via a Gateway Mobile Location Center (GMLC) 160, and/or allow the external client 130 to receive location information regarding the UE 102 (e.g., via the GMLC 160).

The UE 102 may enter a connected state with a wireless communication network that may include the NG-RAN 112. In one example, the UE 102 may communicate with a cellular communication network by transmitting wireless signals to, or receiving wireless signals from a cellular transceiver, in the NG-RAN 112, such as a gNB 110-1. A transceiver provides user and control planes protocol terminations toward the UE 102 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 102 may have circuitry and processing resources capable of obtaining location related measurements. Location related measurements obtained by UE 102 may include measurements of signals received from satellite vehicles (SVs) 190 belonging to a Satellite Positioning System (SPS) or Global Navigation Satellite System (GNSS) such as GPS, GLONASS, Galileo or Beidou and/or may include measurements of signals received from terrestrial transmitters fixed at known locations (e.g., such as gNBs). UE 102 or gNB 110-1 to which UE 102 may send the measurements, may then obtain a location estimate for the UE 102 based on these location related measurements using any one of several position methods such as, for example, GNSS, Assisted GNSS (A-GNSS), Advanced Forward Link Trilateration (AFLT), Angle of Departure (AOD), Time Difference Of Arrival (TDOA), Round-Trip Time (RTT), multicell RTT, WLAN (also referred to as WiFi) positioning, or Enhanced Cell ID (ECID) or combinations thereof. In some of these techniques (e.g. A-GNSS, AFLT, AOD, RTT, and TDOA), pseudoranges or timing differences may be measured at UE 102 relative to three or more terrestrial transmitters (e.g. gNBs) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 102.

The location server in FIG. 1 may correspond to, e.g., Location Management Function (LMF) 152 or Secure User Plane Location (SUPL) Location Platform (SLP) 162, may be capable of providing positioning assistance data to UE 102 including, for example, information regarding signals to be measured (e.g., expected signal timing, signal coding, signal frequencies, signal Doppler), locations and identities of terrestrial transmitters (e.g. gNBs) and/or signal, timing and orbital information for GNSS SVs to facilitate positioning techniques such as A-GNSS, AFLT, AOD, TDOA, RTT, and ECID. The facilitation may include improving signal acquisition and measurement accuracy by UE 102 and, in some cases, enabling UE 102 to compute its estimated location based on the location measurements. For example, a location server (e.g. LMF 152 or SLP 162) may comprise an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g. a gNB) such as transmission power and signal timing. A UE 102 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (Rx-Tx), or a round trip signal propagation time (RTT) between UE 102 and a cellular transceiver (e.g. a gNB) or a local transceiver (e.g. a WiFi access point (AP)). A UE 102 may use these measurements together with assistance data (e.g. terrestrial almanac data or GNSS satellite data such as GNSS Almanac and/or GNSS Ephemeris information) received from a location server (e.g. LMF 152 or SLP 162) or broadcast by a base station (e.g. a gNB 110-1-110-2) in NG-RAN 112 to determine a location for UE 102.

In some implementations, network entities are used to assist in location of a target UE 102. For example, entities in a network such as gNBs 110-1-110-2 may measure UL signals transmitted by UE 102. The UL signals may include or comprise UL reference signals such as UL positioning reference signals (PRSs) or UL Sounding Reference Signals (SRSs). The entities obtaining the location measurements (e.g. gNBs 110-1-110-2) may then transfer the location measurements to the UE 102 or LMF 152, which may use the measurements to determine real time differences (RTDs) for multiple transceiver pairs. Examples of location measurements that may use UL signals can include an RSSI, RSRP, RSRQ, TOA, Rx-Tx, AOA and RTT.

An estimate of a location of the UE 102 may be referred to as a location, location estimate, location fix, fix, position, position estimate or position fix, and may be geographic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of the UE 102 may also be expressed as an area or volume (defined either geographically or in civic form) within which the UE 102 is expected to be located with some probability or confidence level (e.g., 67%, 95%, etc.). A location of the UE 102 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. The location may be expressed as an absolute location estimate for the UE, such as location coordinates or address, or as a relative location estimate for the UE, such as a distance and direction from a previous location estimate or from a known absolute location. The location of the UE may include a linear velocity, an angular velocity, a linear acceleration, an angular acceleration, an angular orientation for the UE, e.g., the orientation of the UE relative to a fixed global or local coordinate system, an identification of a trigger event for locating the UE, or some combination of these. For example, trigger events may include an area event, a motion event, or a velocity event. An area event, for example, may be the UE moving into a defined area, moving out of the area and/or remaining in the area. A motion event, for example, may include movement of the UE by a threshold straight line distance or threshold distance along a UE trajectory. A velocity event, for example, may include the UE attaining a minimum or maximum velocity, a threshold increase and/or decrease of velocity, and/or a threshold change in direction. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 1, pairs of gNBs in NG-RAN 112 may be connected to one another, e.g., directly as shown in FIG. 1 or indirectly via other gNBs 110-1-110-2. Access to the 5G network is provided to UE 102 via wireless communication between the UE 102 and one or more of the gNBs 110-1-110-2, which may provide wireless communication access to the 5GCN 150 on behalf of the UE 102 using 5G (e.g. NR). In FIG. 1, the serving gNB for UE 102 is assumed to be gNB 110-1, although other gNBs (e.g. gNB 110-2, 110-3, or ng-eNB 114) may act as a serving gNB if UE 102 moves to another location or may act as a secondary gNB to provide additional throughput and bandwidth to UE 102. Some gNBs in FIG. 1 (e.g. gNB 110-2, 110-3, or ng-eNB 114) may be configured to function as positioning-only beacons which may transmit signals (e.g. directional PRS) to assist positioning of UE 102 but may not receive signals from UE 102 or from other UEs.

As noted, while FIG. 1 depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 150. Thus, the NG-RAN 112 may include any combination of gNBs, evolved Node Bs (eNBs) supporting LTE, or other types of base stations or access points. As an example, NG-RAN 112 may include one or more ng-eNBs 114, which provide LTE wireless access to UE 102 and may connect to entities in 5GCN 150 such as AMF 154.

The gNBs 110-1, 110-2, 110-3, and ng-eNB 114 can communicate with the Access and Mobility Management Function (AMF) 154, which, for positioning functionality, may communicate with a Location Management Function (LMF) 152. The AMF 154 may support mobility of the UE 102, including cell change and handover and may participate in supporting a signaling connection to the UE 102 and possibly helping establish and release Protocol Data Unit (PDU) sessions for UE 102 supported by the UPF 158. Other functions of AMF 154 may include: termination of a control plane (CP) interface from NG-RAN 112; termination of Non-Access Stratum (NAS) signaling connections from UEs such as UE 102, NAS ciphering and integrity protection; registration management; connection management; reachability management; mobility management; access authentication and authorization.

The gNB 110-1 may support positioning of the UE 102 when UE 102 accesses the NG-RAN 112. The gNB 110-1 may also process location service requests for the UE 102, e.g., received directly or indirectly from the GMLC 160. In some embodiments, a node/system that implements the gNB 110-1 may additionally or alternatively implement other types of location-support modules, such as an Enhanced Serving Mobile Location Center (E-SMLC) or a Secure User Plane Location (SUPL) Location Platform (SLP) 162. It will be noted that in some embodiments, at least part of the positioning functionality (including derivation of UE 102's location) may be performed at the UE 102 (e.g., using signal measurements for signals transmitted by wireless nodes, and assistance data provided to the UE 102).

The GMLC 160 may support a location request for the UE 102 received from an external client 130 and may forward such a location request to a serving AMF 154 for UE 102. The AMF 154 may then forward the location request to either gNB 110-1 or LMF 152 which may obtain one or more location estimates for UE 102 (e.g. according to the request from external client 130) and may return the location estimate(s) to AMF 154, which may return the location estimate(s) to external client 130 via GMLC 160. GMLC 160 may contain subscription information for an external client 130 and may authenticate and authorize a location request for UE 102 from external client 130. GMLC 160 may further initiate a location session for UE 102 by sending a location request for UE 102 to AMF 154 and may include in the location request an identity for UE 102 and the type of location being requested (e.g. such as a current location or a sequence of periodic or triggered locations).

As illustrated, a Unified Data Management (UDM) 161 may be connected to the GMLC 160. The UDM 161 is analogous to a Home Subscriber Server (HSS) for LTE access, and if desired, the UDM 161 may be combined with an HSS. The UDM 161 is a central database that contains user-related and subscription-related information for UE 102 and may perform the following functions: UE authentication, UE identification, access authorization, registration and mobility management, subscription management and Short Message Service management.

As further illustrated in FIG. 1, an external client 130 may be connected to the core network 150 via the GMLC 160 and/or the SLP 162. The external client 130 may optionally be connected to the core network 150 and/or to an SLP 164, that is external to 5GCN 150, via the Internet 175. The external client 130 may be a server, a web server, or a user device, such as a personal computer, a UE, etc.

A Network Exposure Function (NEF) 163 may be connected to the GMLC 160 and the AMF 154. In some implementations, the NEF 163 may be connected to communicate directly with the external client 130 or with an Application Function (AF) 132. The NEF 163 may support secure exposure of capabilities and events concerning 5GCN 150 and UE 102 to an external client 130 or AF 132 and may enable secure provision of information from external client 130 or AF 132 to 5GCN 150. The NEF 163, for example, may also function to obtain a current or last known location for a UE 102, may obtain an indication of a change in location for a UE 102, or an indication of when a UE 102 becomes available (or reachable). An external client 130 or an AF 132 may access NEF 163 in order to obtain location information for UE 102.

The LMF 152 and the gNB 110-1 may communicate using a New Radio Position Protocol A (NRPPa). NRPPa may be defined in 3GPP TS 38.455, with NRPPa messages being transferred between the gNB 110-1 and the LMF 152. Further, the LMF 152 and UE 102 may communicate using the LTE Positioning Protocol (LPP) defined in 3GPP TS 37.355, where LPP messages are transferred between the UE 102 and the LMF 152 via the serving AMF 154 and the serving gNB 110-1 for UE 102. The LPP protocol may be used to support positioning of UE 102 using UE assisted and/or UE based position methods such as Assisted GNSS (A-GNSS), Real Time Kinematic (RTK), Wireless Local Area Network (WLAN), Time Difference of Arrival (TDOA), Round-Trip Time (RTT), and/or Enhanced Cell Identity (ECID). The NRPPa protocol may be used to support positioning of UE 102 using network based position methods such as ECID (when used with measurements obtained by or received from a gNB 110-1, 110-2, 110-3, or ng-eNB 114) and/or may be used by LMF 152 to obtain location related information from gNBs such as parameters defining positioning reference signal (PRS) transmission from gNBs for support of TDOA.

GNBs 110-1, 110-2, 110-3, or ng-eNB 114 may communicate with AMF 154 using a Next Generation Application Protocol (NGAP), e.g. as defined in 3GPP Technical Specification (TS) 38.413). NGAP may enable AMF 154 to request a location of a target UE 102 from a gNB 110-1 for target UE 102 and may enable gNB 110-1 to return a location for UE 102 to the AMF 154.

GNBs 110-1, 110-2, 110-3, or ng-eNB 114 may communicate with one another using an Xn Application Protocol (XnAP), e.g. as defined in 3GPP TS 38.423. XnAP may allow one gNB 110 to request another gNB 110 to obtain UL location measurements for a target UE 102 and to return the UL location measurements. XnAP may also enable a gNB 110 to request another gNB 110 to transmit a downlink (DL) RS or PRS to enable a target UE 102 to obtain DL location measurements of the transmitted DL RS or PRS.

A gNB (e.g. gNB 110-1) may communicate with a target UE 102 using a Radio Resource Control (RRC) protocol, e.g. as defined in 3GPP TS 38.331. RRC may allow a gNB (e.g. gNB 110-1) to request location measurements from the target UE 102 of DL RS s or DL PRSs transmitted by the gNB 110-1 and/or by other gNBs 110-2, 110-3, or ng-eNB 114 and to return some or all of the location measurements. RRC may also enable a gNB (e.g. gNB 110-1) to request the target UE 102 to transmit an UL RS or PRS to enable the gNB 110-1 or other gNBs 110-2, 110-3, or ng-eNB 114 to obtain UL location measurements of the transmitted UL RS or PRS.

With a UE assisted position method, UE 102 may obtain location measurements (e.g. measurements of RSSI, Rx-Tx, RTT, Multi-RTT, AOA, RSTD, RSRP and/or RSRQ for gNBs 110-1, 110-2, 110-3, or ng-eNB 114 or WLAN APs, or measurements of GNSS pseudorange, code phase and/or carrier phase for SVs 190) and send the measurements to an entity performing a location server function, e.g., LMF 152, or SLP 162, for computation of a location estimate for UE 102. With a UE based position method, UE 102 may obtain location measurements (e.g. which may be the same as or similar to location measurements for a UE assisted position method) and may compute a location of UE 102 (e.g. with the help of assistance data received from a location server such as LMF 152 or SLP 162). With a network based position method, one or more base stations (e.g. gNBs 110-1-110-2) or APs may obtain location measurements (e.g. measurements of RSSI, RTT, AOD, RSRP, RSRQ, Rx-Tx or TOA for signals transmitted by UE 102) and/or may receive measurements obtained by UE 102, and may send the measurements to a location server, e.g., LMF 152, for computation of a location estimate for UE 102.

Information provided by the gNBs 110-2, 110-3, or ng-eNB 114 to the gNB 110-1 using XnAP may include timing and configuration information for PRS transmission and location coordinates of the gNBs 110-2, 110-3, or ng-eNB 114. The gNB 110-1 can then provide some or all of this information to the UE 102 as assistance data in an RRC message. An RRC message sent from gNB 110-1 to UE 102 may include an embedded LPP message in some implementations.

An RRC message sent from the gNB 110-1 to the UE 102 may instruct the UE 102 to do any of a variety of things, depending on desired functionality. For example, the RRC message could contain an instruction for the UE 102 to obtain measurements for GNSS (or A-GNSS), WLAN, and/or OTDOA (or some other position method) or to transmit uplink (UL) signals, such as Positioning Reference Signals, Sounding Reference Signals, or both. In the case of OTDOA, the RRC message may instruct the UE 102 to obtain one or more measurements (e.g. RSTD measurements) of PRS signals transmitted within particular cells supported by particular gNBs. The UE 102 may use the measurements to determine the position of UE 102, e.g., using OTDOA.

A gNB in NG-RAN 112 may also broadcast positioning assistance data to UEs such as UE 102.

As illustrated, a Session Management Function (SMF) 156 connects the AMF 154 and the UPF 158. SMF 156 may manage the establishment, modification, and release of PDU sessions for UE 102, perform IP address allocation and management for UE 102, act as a Dynamic Host Configuration Protocol (DHCP) server for UE 102, and select and control a UPF 158 on behalf of UE 102.

The User Plane Function (UPF) 158 may support voice and data bearers for UE 102 and may enable UE 102 voice and data access to other networks such as the Internet 175. UPF 158 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 158 may be connected to SLP 162 to enable support of location of UE 102 using the SUPL location solution defined by the Open Mobile Alliance (OMA). SLP 162 may be further connected to or accessible from external client 130.

It should be understood that while FIG. 1 shows a network architecture for a non-roaming UE, with suitable, well-known, changes, a corresponding network architecture may be provided for a roaming UE.

During a positioning session, in some situations, such during an emergency call or mission critical scenarios, it is desirable for a location server (e.g. LMF 152 or SLP 162) to receive the response from the UE 102 to a positioning related request as quickly as possible. One source of delay found in conventional positioning processes is caused by delays in the UE 102 obtaining UL grants from a base station that is necessary to send the requested positioning information to the location server 152/162. For example, if the UE 102 does not already have an UL grant from the base station, the UE 102 will send a request for the grant using a Scheduling Request (SR) and the base station will respond with the UL grants. The process of obtaining the necessary UL grants from the base station may require up to a few seconds, which is a significant delay, particularly in emergency situations.

To reduce the delay in responding to a location server 152/162 with requested positioning related information, the location server 152/162 provides an indication to the serving base station that the positioning session has high priority and that the UE 102 should be provided UL grants in order to respond to a request. For example, the location server 152/162 may send the indication to the base station, e.g., when the location server 152/162 sends the request to the UE 102. The base station may process the grant and send the UL grants to the UE before the UE is ready to respond to the request. Thus, when the UE is ready to respond to the request, the UE may send the information using the UL grant that has already been received. The UE, accordingly, does not need to request and await the UL grant.

In an NR network, a UE 102 may be in an RRC connected state, an RRC idle state, or an RRC inactive state. The gNB 110 in an NR network may move the UE 102 to an inactive state (from a connected state or an idle state), where the UE connection context (all the configurations) is saved by the gNB 110 and the UE 102. The functionality of the UE 102 in the inactive state is primarily the same as in the idle state, where UE 102 will monitor for paging in the paging Discontinuous Reception (DRX) cycle. However, while in inactive state, the UE 102 may also perform RAN-based notification area updates, e.g., periodically, and when moving outside the configured RAN-based notification area, may acquire system information, and may send System Information (SI) requests (if configured). When the RRC connection is resumed, since the UE connection context is already saved by the gNB 110 and the UE 102, the data activity resumption is fast compared to establishing an RRC connection from an idle state after the RRC connection is released. Thus, with use of an inactive state, the UE 102 will not stay idle in a connected state for long durations, which requires additional power consumption. Additionally, the connection resumption from an inactive state will be fast, and thus, introduces little delay. Only the gNB 110 can suspend the RRC connection to move the UE 102 to an inactive state, but the resumption may be triggered by the UE or gNB 110.

Figure 2:
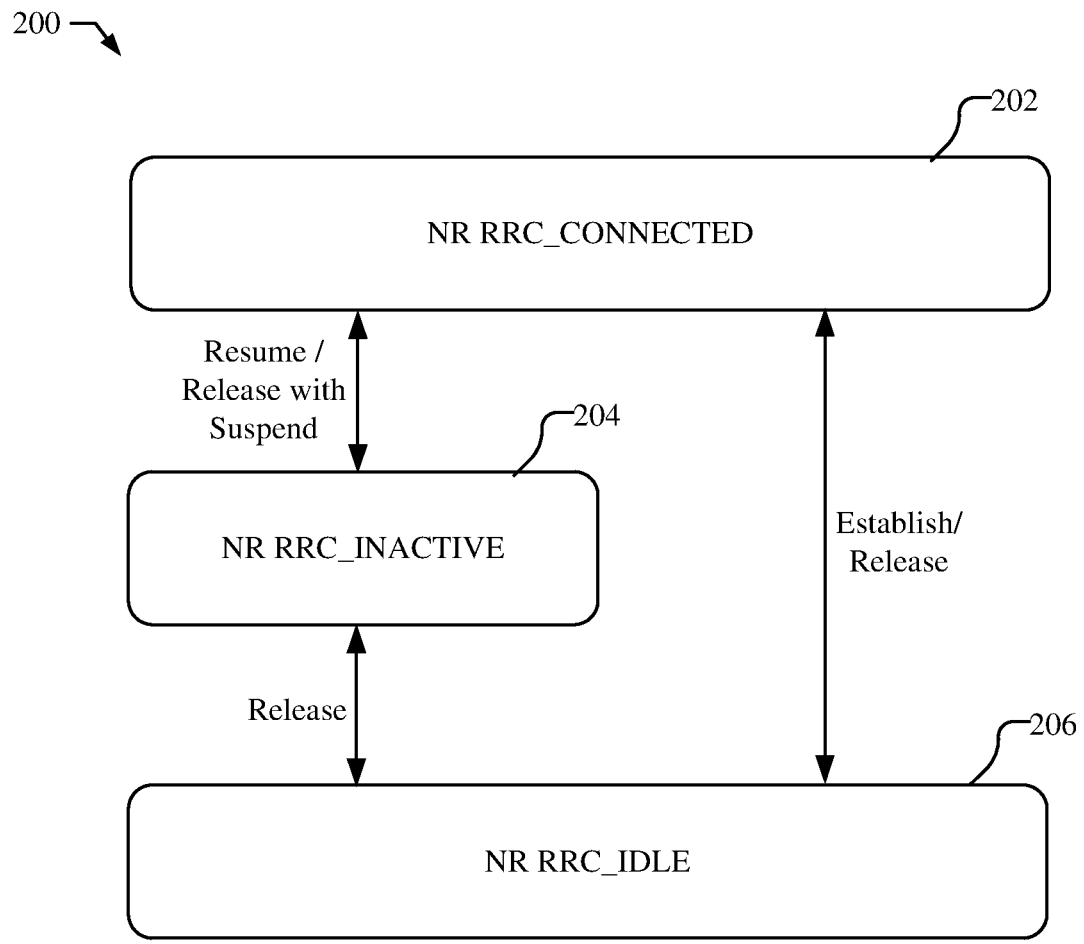
FIG. 2 illustrates a Radio Resource Control (RRC) connection state machine and state transitions.

FIG. 2, by way of example, illustrates a simple UE RRC state machine 200 and state transitions in NR, e.g., as described in 3GPP TS 38.331. A UE 102 may have only one RRC state in NR at one time. As illustrated, the UE 102 may have an NR RRC_CONNECTED state 202, an NR RRC_INACTIVE state 204, or an NR RRC_IDLE state 206. A UE 102 may be in either the RRC_CONNECTED state 202 or the RRC_INACTIVE state 204 when an RRC connection has been established. If this is not the case, i.e. no RRC connection has been established, the UE 102 is in RRC_IDLE state 206.

In the RRC_IDLE state 206, a UE specific DRX may be configured by upper layers and UE controlled mobility may be based on network configuration. While in RRC_IDLE state 206, the UE 102 may monitor Short Messages transmitted with Paging Radio Network Temporary Identifier (P-RNTI) over Downlink Control Information (DCI), monitor a Paging channel for Core Network (CN) paging using 5G-Serving Temporary Mobile Subscriber Identity (S-TMSI), performs neighboring cell measurements and cell (re-)selection, acquire system information and send SI request (if configured), and perform logging of available measurements together with location and time for logged measurement configured UEs.

In the RRC_INACTIVE state 204, a UE specific DRX may be configured by upper layers or by RRC layer, and UE controlled mobility may be based on network configuration. Additionally, the UE 102 stores the UE Inactive Access Stratum (AS) context, and a RAN-based notification area is configured by RRC layer. While in RRC_INACTIVE state 204, the UE 102 may monitor short messages transmitted with P-RNTI over DCI, monitor a Paging channel for CN paging using 5G-S-TMSI and RAN paging using full Inactive-RNTI (I-RNTI); perform neighboring cell measurements and cell (re-)selection. Additionally, the UE 102 may perform RAN-based notification area updates periodically and when moving outside the configured RAN-based notification area, acquire system information and send SI request (if configured), and performs logging of available measurements together with location and time for logged measurement configured UEs.

In the RRC_CONNECTED state 202, the UE 102 stores the AS context, is configured for transfer of unicast data to/from UE, and at lower layers, the UE 102 may be configured with a UE specific DRX. UEs configured for supporting carrier aggregation (CA), may use of one or more SCells, aggregated with the SpCell, for increased bandwidth. UEs configured for supporting Dual Connectivity (DC), use of one Secondary Cell Group (SCG), aggregated with the Master Cell Group (MCG), for increased bandwidth. Further, the RRC_Connected state 202 includes network controlled mobility within NR and to/from E-UTRA. While in RRC_CONNECTED state 202, the UE 102 may monitor short messages transmitted with P-RNTI over DCI, if configured, monitor control channels associated with the shared data channel to determine if data is scheduled for it, provide channel quality and feedback information, performs neighboring cell measurements and measurement reporting, and may acquire system information.

As illustrated in FIG. 2, from the NR RRC_CONNECTED state 202, the UE 102 may transition to the NR RRC_IDLE state 206 by being released by the gNB 110. The UE 102 may transition from the NR RRC_IDLE state 206 to the NR RRC CONNECTED state 202 by establishing the connection.

Additionally, from the NR RRC_CONNECTED state 202, the UE 102 may transition to the NR RRC_INACTIVE state 204 by being released with suspend (sometimes referred to simply as suspended) by the gNB 110. From the NR RRC_INACTIVE state 204, the UE 102 may transition back to the NR RRC CONNECTED state 202 by resuming the connection. Because the gNB 110 and the UE 102 both store UE connection context, including the AS context, the resuming the NR RRC_CONNECTED state 202 from the NR RRC_INACTIVE state 204 can be significantly faster and require less messaging than establishing the NR RRC_CONNECTED state 202 from the NR RRC_IDLE state 206. Additionally, as illustrated, while in the NR RRC_INACTIVE state 204, the UE 102 may transition to the NR RRC_IDLE state 206 by being released by the gNB 110.

As discussed above, only the gNB 110 can suspend the RRC connection and cause the UE 102 to transition to an inactive state, e.g., from NR RRC_CONNECTION state 202 to the NR RRC_INACTIVE state 204. During a positioning session between a location server, e.g., LMF 152, and the UE 102, however, messages are transmitted using LPP in which the messages pass through the serving gNB 110, and the gNB 110 is not aware of the details of the messaging. Accordingly, during a positioning session, the gNB 110 is not aware of timing instructions to the UE 102 from the location server, e.g., frequency of positioning measurements, or if the location server has even requested positioning measurements from the UE. Accordingly, the gNB 110 does not have timing information for positioning that is necessary to determine whether the RRC connection with the UE 102 should be suspended and the UE 102 placed in inactive mode.

Accordingly, in one implementation, the location server, e.g., LMF 152, may communicate with the base station, e.g., gNB 110, to suspend the RRC connection with the UE 102, e.g. to transition the UE 102 to inactive state when the location server determines that the UE 102 will not be required to send a position information message to the location server for an extended period of time, e.g., the location server will not request measurements for an extended period or the location measurements from the UE 102 will be reported infrequently. The location server, for example, may provide an indication to the base station of the time until a connection with the UE 102 will be required, e.g., a time until the location server will request positioning measurements, or a time until a periodic trigger for reporting positioning measurements will occur. The base station, for example, may determine, e.g. based on data activity of the UE 102 and network congestion, whether to suspend the RRC connection of the UE 102 and to place the UE 102 in inactive mode.

After the base station 110 suspends the RRC connection with the UE 102 and transitions the UE 102 to inactive state, the UE connection context is stored by the UE 102 and the base station 110. The UE 102 may resume the connection, e.g., when position measurements are ready to be sent. For example, the location server may page the UE 102 to request positioning measurements while the UE 102 is in the inactive state, or the UE 102 may be configured to perform periodic positioning measurements. The UE 102 may perform the position measurements, such as GNSS measurements, or cellular based positioning, e.g., using DL PRS signals received from base stations, while in inactive mode. When the UE 102 is prepared to send the positioning measurements to the location server, the UE 102 may send a request to the base station 110 to resume the RRC connection. Because the UE 102 and base station store the UE connection context while the UE is in an inactive state, the resumption of the RRC connection can be fast, and can consume less power compared to the regular connection release/establishment between the idle state and connected state. If the UE 102 determines that the position session has ended, the UE 102 may request that the base station 110 to release the connection and transition the UE 102 to the idle state.

Figure 3:
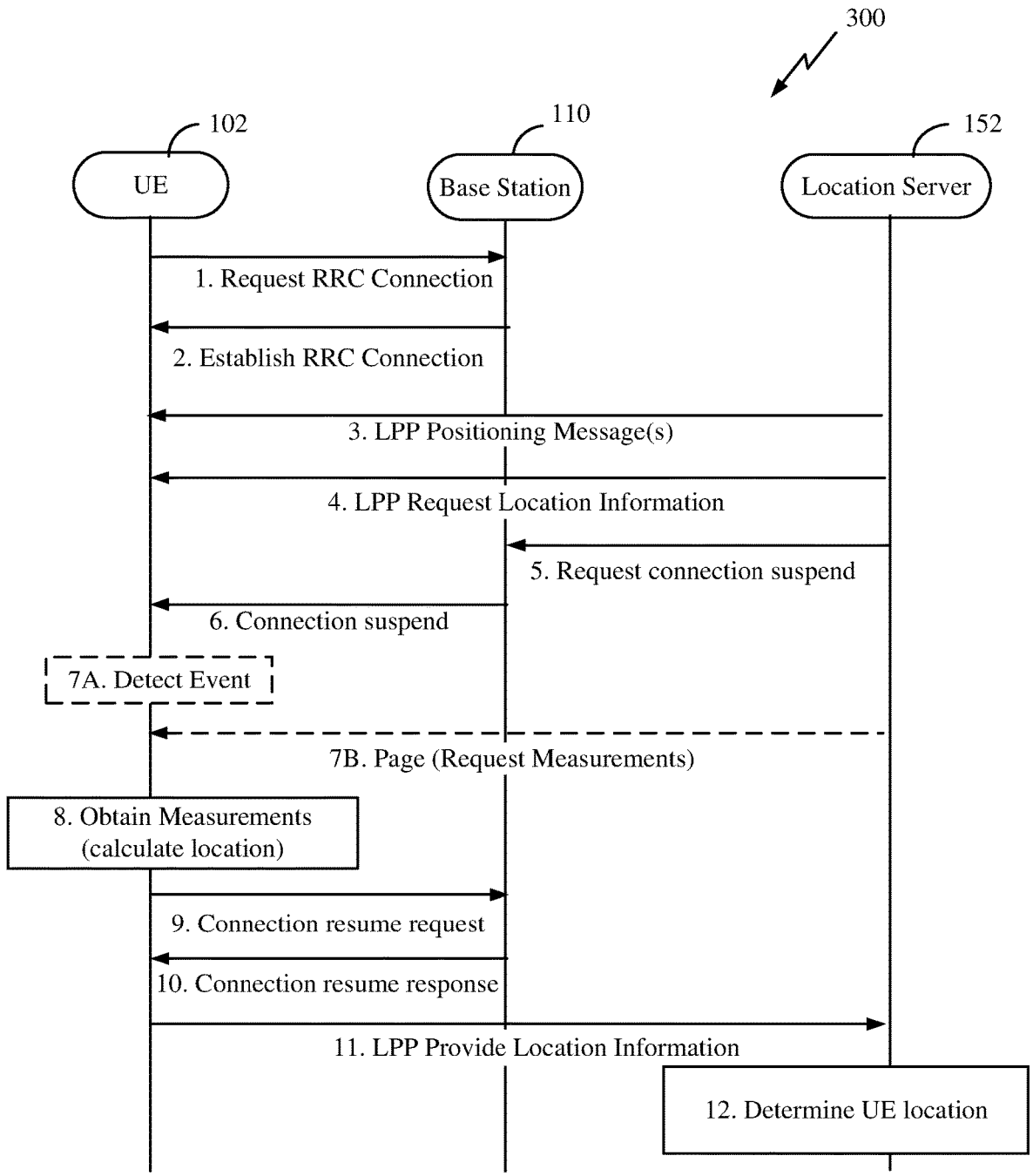
FIG. 3 shows a signaling flow that illustrates various messages sent between components of the communication system during a location session in which the location server requests suspension of the RRC connection.

FIG. 3 shows a signaling flow 300 that illustrates various messages sent between components of the communication system 100 depicted in FIG. 1, during a location session between the UE 102 and the location server 152 in which the location server requests suspension of the RRC connection of the UE 102 during a positioning session as discussed herein. While the flow diagram is discussed, for ease of illustration, in relation to a 5G NR wireless access using gNBs 110, signaling flows similar to FIG. 3 involving ng-eNBs 114 or eNBs rather than gNBs 110 will be readily apparent to those with ordinary skill in the art. Furthermore, it should be understood that the messages in signaling flow 300 are provided to illustrate a process of establishing an RRC connection and the location server requesting suspension of the RRC connection during a positioning session, and that additional messages and actions may be included in the positioning session. In the signaling flow 300, it is assumed that the UE 102 and location server 152 communicate using the LPP positioning protocol referred to earlier, although use of NPP or a combination of LPP and NPP is also possible. The signaling flow 300 may be performed in control plane or user plane.

At stage 1, the UE 102 may send a message (e.g. RRC message) to the base station 110 to request the establishment of an RRC connection. The message may be sent by the UE 102 in response to receiving a paging message from the base station 110 (not shown in FIG. 3), which may occur, for example, if an AMF 154 needs to establish a connection to the UE 102 in order to support positioning of the UE 102 (e.g. as described below for stages 3-12).

At stage 2, the base station 110 may send a message to the UE 102 to establish the RRC connection. Although stages 1 and 2 describe just 2 messages, additional messages can be sent to establish the RRC Connection—e.g. if the UE 102 was initially in an RRC IDLE state.

At stage 3, the location server 152 may send one or more messages to the UE 102 for a positioning session. For example, the message may be a request for capabilities, to which the UE 102 is expected to respond. In another example, the message may be a provide assistance data message to the UE 102 providing assistance data via the base station 110, which includes assistance data for UE measurements. The assistance data may be for ECID, AOD, RTT, TDOA, A-GNSS and/or other position methods supported by UE 102. In some embodiments, the location server 152 may have requested and the UE 102 may have provided positioning capabilities, and the assistance data may be consistent with the UE capabilities. Additionally, in some embodiments, the UE 102 may send an LPP Request Assistance Data message to the location server 152 prior to stage 3.

At stage 4, the location server 152 may send an LPP request location information message to the UE 102 via the base station 110 that includes a request for location measurements, e.g., for AOD, RTT, TDOA, A-GNSS, ECID, etc. The LPP Request Location Information message sent at stage 4 may indicate a long response time (e.g. a time greater than 20 seconds), or may indicate a periodic or triggered positioning with a longer period for responding (e.g. a period of 1 to 30 minutes).

At stage 5, the location server 152 may send a message (e.g. an NRPPa message) to the base station 110 requesting suspension of the RRC connection between the UE 102 and the base station 110. The message, for example, may be a recommendation that the RRC connection is suspended. Alternatively, the message may include an indication of a time duration during which no messaging between the UE 102 and the location server 152 is expected. For example, the time duration may be based on the expected time until the UE 102 performs positioning measurements. For example, the request for location information from the location server 152 to the UE 102 may not occur for a period of time, or the positioning session may be a periodic or triggered positioning session and the UE 102 may not be required to obtain and report positioning measurements for a period of time. The time duration, for example, may be based on the time until the provide location information message from the UE 102 is expected. In another implementation, the time duration may be based on the time until a positioning related request to the UE 102 is expected. For example, stage 5 may occur before stage 4, and the time duration may be the time until the request for location information is expected to be sent by the location server 152. Similarly, the stage 5 may occur earlier, and the time duration may be the time until the request for capabilities or any other positioning request is expected to be sent by the location server 152. In some implementations, the location server 152 may determine that the UE 102 is moving, and a RAN update, e.g., handoff to another base station, may occur before the next positioning message is expected. The location server 152 may, accordingly, include an indication of movement of the UE 102 and request that the connection be released to place the UE 102 in an idle state.

At stage 6, the base station 110 may determine, at least partially in response to the message from the location server 152 at stage 5, that the RRC connection with the UE 102 should be suspended and may send a connection suspend message (e.g. an RRC Release message with a suspend indication) to the UE 102 to place the UE 102 in an RRC INACTIVE state. In some implementations, the base station 110 may determine data activity for UE 102 that uses the connection with the base station 110 and the determination to suspend the connection may be further based on the data activity, e.g., if there is little scheduled activity, e.g., no activity or less than a threshold. In response to the suspend message, the UE 102 transitions from an RRC connected state to an inactive state. The base station 110 and the UE 102 store a UE connection context, such as the AS context, so that the RRC connection may be resumed quickly with little signaling between the UE 102 and the base station 110. In some implementations, the UE 102 may determine the mobility state of the UE, e.g. high mobility, medium mobility, or low mobility, where the message at stage 6 includes an indication of the mobility state of the UE 102 and may request for release of the connection to put the UE 102 in idle state if the UE 102 has a high mobility state and may request suspension of the connection to put the UE 102 in inactive state if the UE 102 is in a low mobility state. The base station 110 may determine to release the connection, e.g., if the UE is in a high mobility state, and may send a release message to place the UE 102 in an idle state.

At optional stage 7A, the UE 102 may detect an event triggering positioning measurements for the positioning session, such as a periodic event, e.g., if the positioning session is a periodic or triggered positioning session.

At optional stage 7B, the location server 152 may send a paging message that includes a measurement request to the UE 102. For example, while the UE 102 is in an inactive state, the UE 102 continues to monitor a paging channel for CN paging using 5G-S-TMSI and RAN paging using full Inactive-RNTI (I-RNTI), which may be used to indicate to the UE 102 to perform positioning measurements.

At stage 8, the UE 102 may obtain positioning measurements, such as AOD, RTT, TDOA, A-GNSS, ECID, etc., while still in an inactive state. In some implementations, the UE 102 may additionally estimate a location of the UE based on the positioning measurements.

At stage 9, the UE 102 may send a connection resume request message to the base station 110, requesting the resumption of the RRC connection. The connection resume request, for example, may include the stored UE connection context stored by the UE, such as the AS context, to assist in resumption of the RRC connection.

At stage 10, the base station 110 may send a connection resume response message to the UE 102 to resume the RRC connection between the UE 102 and the base station 110. The base station 110, for example, may resume the connection based on the UE context information received from the UE 102 in the message at stage 9, as well as the UE context information stored by the base station 110, while the UE 102 is in an inactive state.

At stage 11, after the UE 102 has resumed the RRC connection with the base station 110, the UE 102 transmits an LPP Provide Location Information message to the location server 152 via the base station 110 that includes the UE location measurements and/or location estimate obtained at stage 8.

At stage 12, the location server 152 may determine (e.g., calculate) or verify the UE 102 location using the measurements and/or position estimate received at stage 11.

Figure 4:
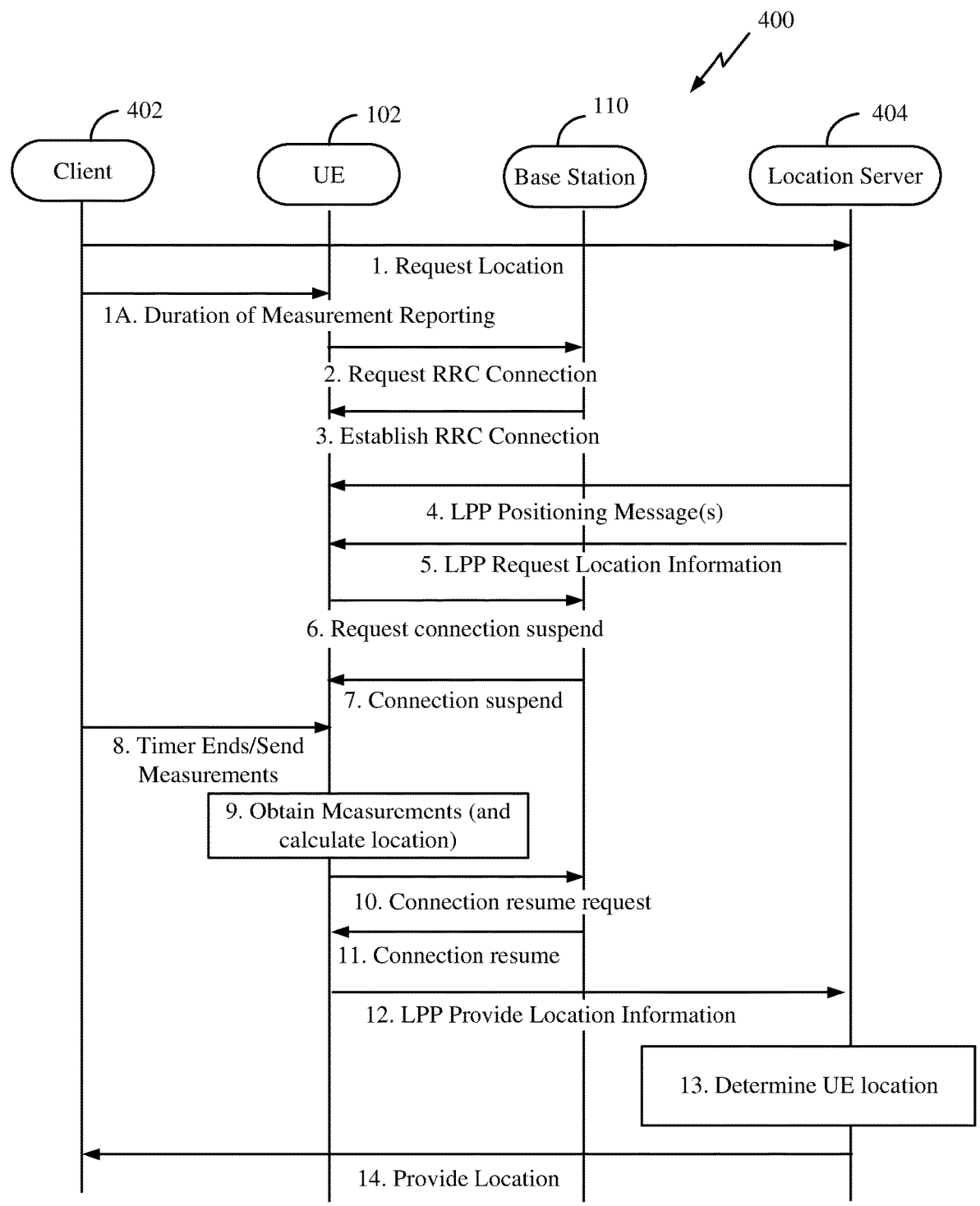
FIG. 4 shows a signaling flow that illustrates various messages sent between components of the communication system during a location session in which the user equipment (UE) requests suspension of the RRC connection.

FIG. 4 shows a signaling flow 400 that illustrates various messages sent between components of the communication system 100 depicted in FIG. 1, during a location session between the UE 102 and a location server 404 in which the UE 102 requests suspension of an RRC connection during a positioning session, as discussed herein. While the flow diagram is discussed, for ease of illustration, in relation to a 5G NR wireless access using gNBs 110, signaling flows similar to FIG. 3 involving ng-eNBs 114 or eNBs rather than gNBs 110 will be readily apparent to those with ordinary skill in the art. Furthermore, it should be understood that the messages in signaling flow 400 are provided to illustrate a process of establishing an RRC connection and the UE 102 requesting suspension of the RRC connection during a positioning session, and that additional messages and actions may be included in the positioning session. In the signaling flow 400, it is assumed that the UE 102 and location server 404 communicate using the LPP positioning protocol referred to earlier. The signaling flow 400 may be performed in control plane or user plane. When the signaling flow 400 is performed in control plane, the location server 404 may be an LMF 152. When the signaling flow 400 is performed in user plane, the location server 404 may be an SLP 162 and LPP messages shown in FIG. 4 at stages 4, 5 and 12 may each be transferred inside a SUPL message, e.g. a SUPL POS message.

A stage 1, a client 402, which may be either internal to the UE 102 (e.g. may be an App inside the UE 102) or external to the UE 102 (e.g. may be a web server) sends a request to the location server 404 to request the location of UE 102. The request may be sent directly to the location server 404 if the location server 404 is an SLP 162. The request may be sent indirectly to the location server 404 through other intermediate entities if the location server 404 is an LMF 152, e.g. may be sent to the location server 404 via a GMLC 160 and AMF 154.

At stage 1A, the UE 102 may receive a request for, or an indication of, positioning from the client 402. The request or indication may include an indication of the duration of measurement reporting, e.g., for periodic or triggered positioning.

At stage 2, the UE 102 may send a message to the base station 110 to request an RRC connection.

At stage 3, the base station 110 may send a message to the UE 102 to establish the RRC connection.

At stage 4, the location server 404 may send one or more messages to the UE 102 for a positioning session. For example, the message may be a request for capabilities, to which the UE 102 is expected to respond. In another example, the message may be a provide assistance data message to the UE 102 providing assistance data via the base station 110, which includes assistance data for UE measurements. The assistance data may be for ECID, AOD, RTT, TDOA, A-GNSS and/or other position methods supported by UE 102. In some embodiments, the location server 404 may have requested and the UE 102 may have provided positioning capabilities, and the assistance data may be consistent with the UE capabilities. Additionally, in some embodiments, the UE 102 may send an LPP Request Assistance Data message to the location server 404 prior to stage 4.

At stage 5, the location server 404 may send an LPP request location information message to the UE 102 via the base station 110 that includes a request for location measurements, e.g., for AOD, RTT, TDOA, A-GNSS, ECID, etc. The LPP Request Location Information message sent at stage 5 may indicate a long response time, or may indicate a periodic or triggered positioning with a longer period for responding.

At stage 6, the UE 102 may send a message to the base station 110 requesting suspension of the RRC connection between the UE 102 and the base station 110. The message, for example, may be a recommendation that the RRC connection is suspended. Alternatively, the message may include an indication of a time duration during which no messaging between the UE 102 and the location server 404 is expected. For example, the time duration may be based on an expected time until the UE 102 performs positioning measurements. For example, the request for location information from the location server 404 to the UE 102 may not occur for a period of time, or the positioning session may be a periodic or triggered positioning session and the UE 102 may not be required to obtain and report positioning measurements for a period of time. The time duration, for example, may be based on a time until a provide location information message from the UE 102 is expected. In another implementation, the time duration may be based on a time until the positioning related request from the location server 404 is expected. For example, stage 6 may occur before stage 5, and the time duration may be a time until the request for location information is expected to be sent by the location server 404. Similarly, stage 6 may occur before stage 4, and the time duration may be the time until the request for capabilities or any other positioning request is expected to be sent by the location server 404. In some implementations, the UE 102 may determine data activity using the connection with the base station 110 and may send the message to the base station 110 if there is little scheduled activity, e.g., no activity or less than a threshold. In some implementations, the UE 102 may determine that the UE 102 is moving, and a RAN update, e.g., handoff to another base station, may occur before the next positioning message is expected. The UE 102 may, accordingly, include an indication of movement of the UE 102 and request that the connection be released to place the UE 102 in an idle state.

At stage 7, the base station 110 may determine, at least partially in response to the message from the UE 102 at stage 6, that the RRC connection with the UE 102 should be suspended and may send a connection suspend message to the UE 102. In some implementations, the base station 110 may determine the data activity for UE 102 that uses the connection with the base station 110 and the determination to suspend the connection may be further based on the data activity, e.g., if there is little scheduled activity, e.g., no activity or less than a threshold. In response to the suspend message, the UE 102 transitions from an RRC connected state to an inactive state. The base station 110 and the UE 102 store a UE connection context, such as the AS context, so that the RRC connection may be resumed quickly with little signaling between the UE 102 and the base station 110. In some implementations, where the message at stage 6 includes an indication of movement of the UE 102 and a request for release of the connection, the base station 110 may determine to release the connection and send a release message to place the UE 102 in an idle state.

At stage 8, the client 402 may detect an event trigger for the positioning session, such as a periodic event or timer, e.g., if the positioning session is a periodic or triggered positioning session. The client 402 may indicate to the UE 102 that the timer has ended and position measurements are to be performed and/or positioning information message is to be provided to the location server 404.

At stage 9, the UE 102 may obtain positioning measurements, such as AOD, RTT, TDOA, A-GNSS, ECID, etc., while still in an inactive state. In some implementations, the UE 102 may additionally estimate a location of the UE 102 based on the positioning measurements.

At stage 10, the UE 102 may send a connection resume request message to the base station 110, requesting a resumption of the RRC connection. The connection resume request, for example, may include the stored UE connection context stored by the UE 102, such as the AS context, to assist in resumption of the RRC connection.

At stage 11, the base station 110 may send a connection resume response message to the UE 102 to resume the RRC connection between the UE 102 and the base station 110. The base station 110, for example, may resume the connection based on the UE context information received from the UE 102 in the message at stage 10, as well as the UE context information stored by the base station 110, while the UE 102 is in an inactive state.

At stage 12, after the UE 102 has resumed the RRC connection with the base station 110, the UE 102 transmits an LPP Provide Location Information message to the location server 404 via the base station 110 that includes the UE location measurements and/or location estimate obtained at stage 9.

At stage 13, the location server 404 may determine (e.g., calculate) or verify the UE 102 location using the measurements and/or position estimate received at stage 12.

At stage 14, the location server 404 may send the UE 102 location to the client 402 (e.g. via the UE 102 if the client 402 is internal to the UE 102).

Figure 5:
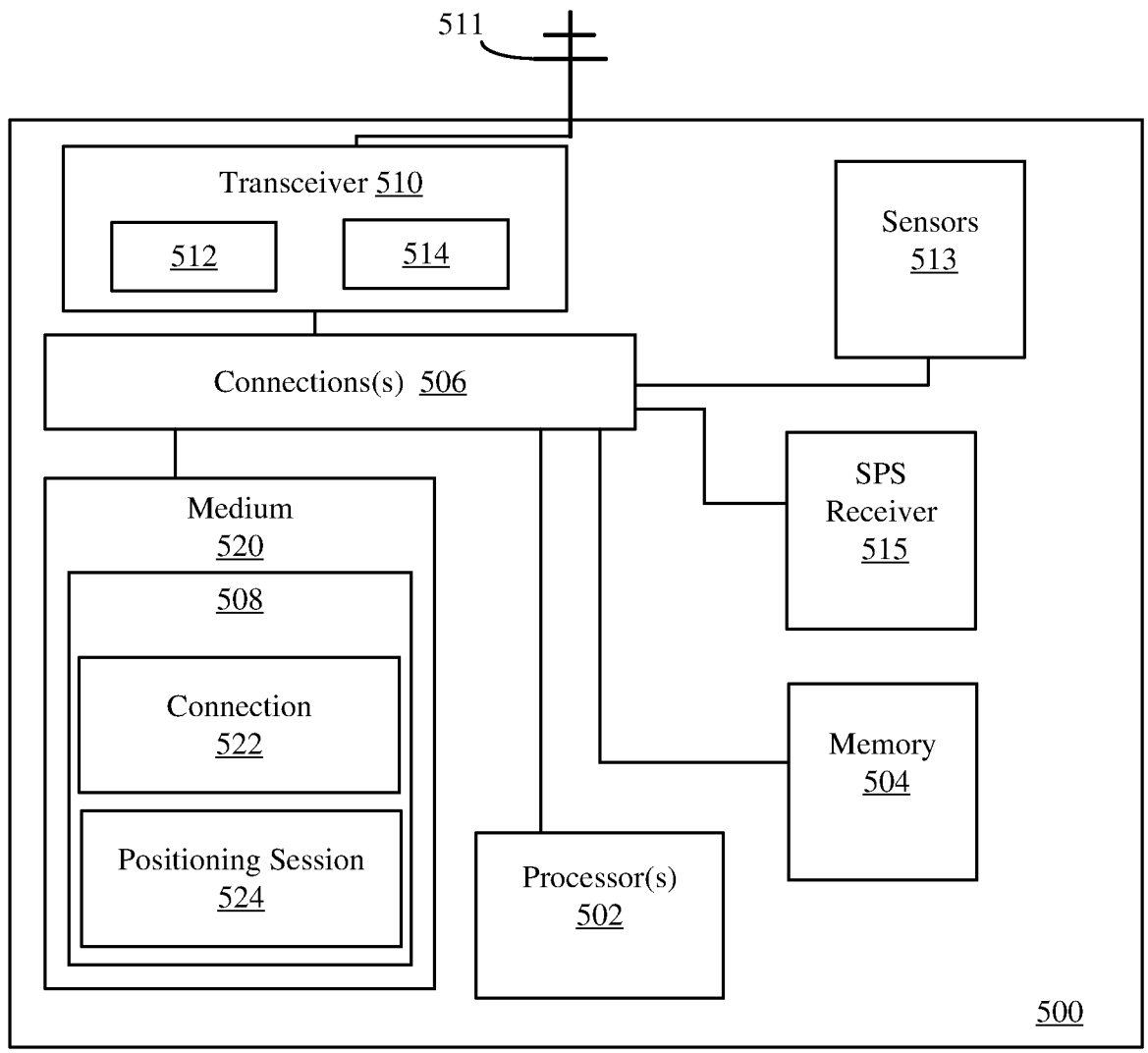
FIG. 5 shows a schematic block diagram illustrating certain exemplary features of a UE that is configured to request suspension of the RRC connection with a base station during a positioning session.

FIG. 5 shows a schematic block diagram illustrating certain exemplary features of a UE 500, e.g., which may be UE 102 shown in FIG. 1, that is configured for supporting positioning and to request suspension and resumption of an RRC connection with a base station during the positioning session, as discussed herein. The UE 500, for example, may perform the process flow shown in FIG. 8 and algorithms disclosed herein. The UE 500 may, for example, include one or more processors 502, memory 504, an external interface such as at least one wireless transceiver 510 (e.g., wireless network interface), SPS receiver 515, and one or more sensors 513, which may be operatively coupled with one or more connections 506 (e.g., buses, lines, fibers, links, etc.) to non-transitory computer readable medium 520 and memory 504. The SPS receiver 515, for example, may receive and process SPS signals from SVs 190 shown in FIG. 1. The one or more sensors 513, for example, may be an inertial measurement unit (IMU) that may include one or more accelerometers, one or more gyroscopes, a magnetometer, etc. The UE 500 may further include additional items, which are not shown, such as a user interface that may include e.g., a display, a keypad or other input device, such as virtual keypad on the display, through which a user may interface with the UE. In certain example implementations, all or part of UE 500 may take the form of a chipset, and/or the like.

The at least one wireless transceiver 510 may be a transceiver for both a WWAN communication system and a WLAN communication system, or may include separate transceivers for WWAN and WLAN. The wireless transceiver 510 may include a transmitter 512 and receiver 514 coupled to one or more antennas 511 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. Thus, the transmitter 512 may include multiple transmitters that may be discrete components or combined/integrated components, and/or the receiver 514 may include multiple receivers that may be discrete components or combined/integrated components. The wireless transceiver 510 may be configured to communicate signals (e.g., with base stations and access points and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wireless transceiver 510 may be communicatively coupled to a transceiver interface, e.g., by optical and/or electrical connection, which may be at least partially integrated with the wireless transceiver 510.

In some embodiments, UE 500 may include antenna 511, which may be internal or external. UE antenna 511 may be used to transmit and/or receive signals processed by wireless transceiver 510. In some embodiments, UE antenna 511 may be coupled to wireless transceiver 510. In some embodiments, measurements of signals received (transmitted) by UE 500 may be performed at the point of connection of the UE antenna 511 and wireless transceiver 510. For example, the measurement point of reference for received (transmitted) RF signal measurements may be an input (output) terminal of the receiver 514 (transmitter 512) and an output (input) terminal of the UE antenna 511. In a UE 500 with multiple UE antennas 511 or antenna arrays, the antenna connector may be viewed as a virtual point representing the aggregate output (input) of multiple UE antennas. In some embodiments, UE 500 may measure received signals including signal strength and TOA measurements and the raw measurements may be processed by the one or more processors 502.

The one or more processors 502 may be implemented using a combination of hardware, firmware, and software. For example, the one or more processors 502 may be configured to perform the functions discussed herein by implementing one or more instructions or program code 508 on a non-transitory computer readable medium, such as medium 520 and/or memory 504. In some embodiments, the one or more processors 502 may represent one or more circuits configurable to perform at least a portion of a data signal computing procedure or process related to the operation of UE 500.

The medium 520 and/or memory 504 may store instructions or program code 508 that contain executable code or software instructions that when executed by the one or more processors 502 cause the one or more processors 502 to operate as a special purpose computer programmed to perform the techniques disclosed herein. As illustrated in UE 500, the medium 520 and/or memory 504 may include one or more components or modules that may be implemented by the one or more processors 502 to perform the methodologies described herein. While the components or modules are illustrated as software in medium 520 that is executable by the one or more processors 502, it should be understood that the components or modules may be stored in memory 504 or may be dedicated hardware either in the one or more processors 502 or off the processors.

A number of software modules and data tables may reside in the medium 520 and/or memory 504 and be utilized by the one or more processors 502 in order to manage both communications and the functionality described herein. It should be appreciated that the organization of the contents of the medium 520 and/or memory 504 as shown in UE 500 is merely exemplary, and as such the functionality of the modules and/or data structures may be combined, separated, and/or be structured in different ways depending upon the implementation of the UE 500.

The medium 520 and/or memory 504 may include a connection module 522 that when implemented by the one or more processors 502 configures the one or more processors 502 to send and receive messages to establish an RRC connection with a serving base station, via the wireless transceiver 510. The one or more processors 502 may be further configured to send a request to the base station, e.g. via the wireless transceiver, to suspend the connection between the base station and the UE, thereby placing the UE in an inactive state. The one or more processors 502 may be configured, for example, to request a connection suspension during a positioning session at least partially based on the time until positioning measurements are to be performed or positioning information transmitted to a location server. The one or more processors 502 may be further configured to determine data activity that is scheduled for the UE during a positioning session, wherein the request for connection suspension may be further based on the data activity. The one or more processors 502 may include with the request, the time duration during which position related messages between the UE and the location server are not expected may be a time for the UE to perform the positioning measurements. While in the inactive state, the one or more processors 502 may be configured to store the UE connection context, e.g., AS context, e.g., in memory 504, which may be used to resume the connection. The one or more processors 502 may be configured to send a request to the base station, e.g., via the wireless transceiver 510, to resume the connection, e.g. when positioning measurements are to be performed or when positioning information is to be sent to the location server, and to receive a message from the base station to resume the connection using the UE connection context. In some implementations, the one or more processors 502 may be configured to determine movement of the UE, e.g. based on positioning measurements or sensor data, which may indicate that the UE 102 is moving, and that a RAN update, e.g., handoff to another base station, may occur before the next positioning message is expected. The one or more processors 502 may be configured to send a request to the base station, e.g., via the wireless transceiver 510, to release the connection based on the movement, and may include an indication of the movement to the base station.

The medium 520 and/or memory 504 may include a positioning session module 524 that when implemented by the one or more processors 502 configures the one or more processors 502 to engage in a positioning session with a location server through a serving base station, via the wireless transceiver 510, including receiving location service requests, such as a request for positioning capabilities, and a request of location information, such as positioning measurements, e.g., for a UE-assisted positioning process, or a position estimate, e.g., for a UE based positioning process. The one or more processors 502 are configured to send a response to the location service requests, e.g. by providing positioning capabilities and the requested location information. The one or more processors 502 may be further configured to receive assistance data. The one or more processors 502 are further configured to perform requested positioning measurements, which may be, e.g., RxTx, AOA, TOA, RSRP, etc., or other types of measurements, such as using WiFi or SPS measurements. The one or more processors 502 may be configured to receive a periodic location request. The one or more processors 502 maybe further configured to determine a position estimate based on the positioning measurements and the assistance data.

The methodologies described herein may be implemented by various means depending upon the application. For example, these methodologies may be implemented in hardware, firmware, software, or any combination thereof. For a hardware implementation, the one or more processors 502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 520 or memory 504 that is connected to and executed by the one or more processors 502. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 508 on a non-transitory computer readable medium, such as medium 520 and/or memory 504. Examples include computer readable media encoded with a data structure and computer readable media encoded with a computer program code 508. For example, the non-transitory computer readable medium including program code 508 stored thereon may include program code 508 to support suspension of an RRC connection between the UE and a base station during a positioning session in a manner consistent with disclosed embodiments. Non-transitory computer readable medium 520 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 508 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 520, instructions and/or data may be provided as signals on transmission media included in a communication apparatus. For example, a communication apparatus may include a wireless transceiver 510 having signals indicative of instructions and data. The instructions and data are configured to cause one or more processors to implement the functions outlined in the claims. That is, the communication apparatus includes transmission media with signals indicative of information to perform disclosed functions.

Memory 504 may represent any data storage mechanism. Memory 504 may include, for example, a primary memory and/or a secondary memory. Primary memory may include, for example, a random access memory, read only memory, etc. While illustrated in this example as being separate from one or more processors 502, it should be understood that all or part of a primary memory may be provided within or otherwise co-located/coupled with the one or more processors 502. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 520. As such, in certain example implementations, the methods and/or apparatuses presented herein may take the form in whole or part of a computer readable medium 520 that may include computer implementable program code 508 stored thereon, which if executed by one or more processors 502 may be operatively enabled to perform all or portions of the example operations as described herein. Computer readable medium 520 may be a part of memory 504.

Figure 6:
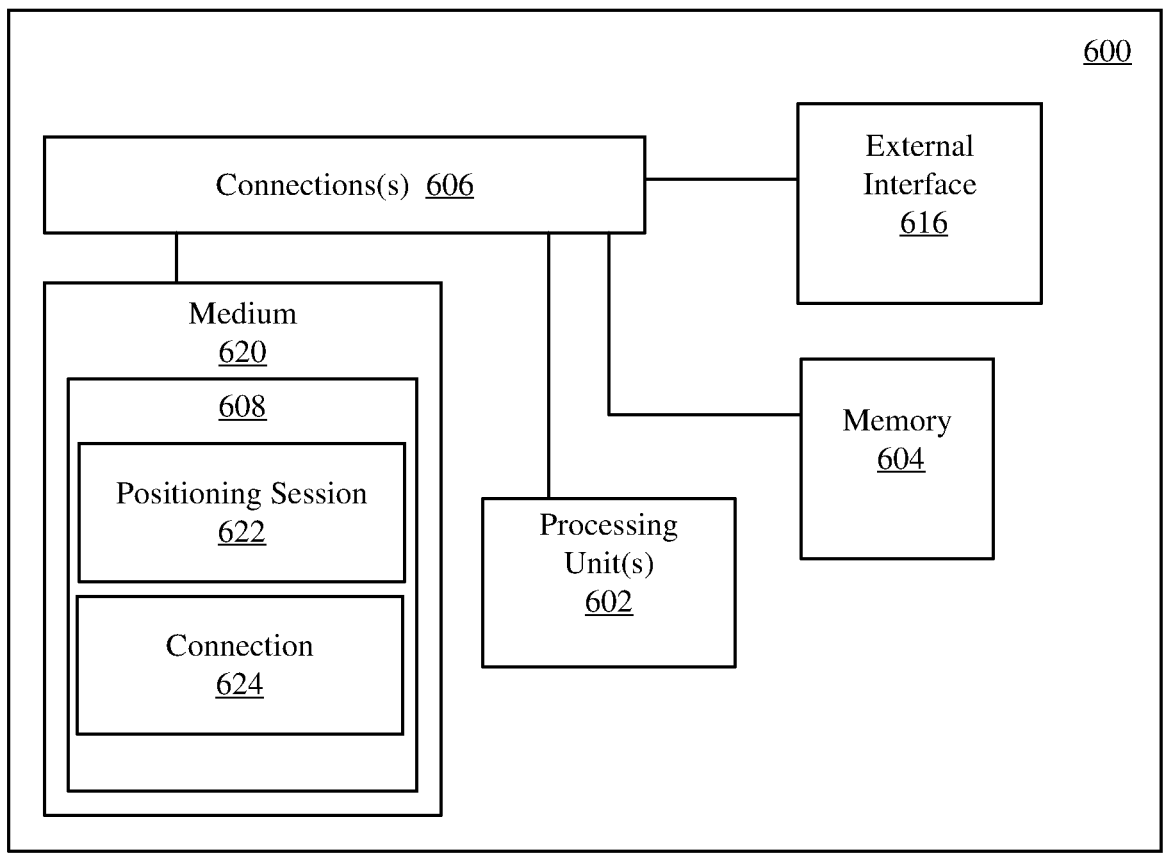
FIG. 6 shows a schematic block diagram illustrating certain exemplary features of a location server that is configured request suspension of the RRC connection between the UE and a base station during a positioning session.

FIG. 6 shows a schematic block diagram illustrating certain exemplary features of a location server 600, e.g., LMF 152 or SLP 162, shown in FIGS. 1 and 2, that is configured to support positioning of a UE and to request suspension and resumption of an RRC connection between the UE and a base station during the positioning session, as discussed herein. The location server 600 may perform the process flow, e.g., shown in FIG. 9 and algorithms disclosed herein. Location server 600 may, for example, include one or more processors 602, memory 604, an external interface 616 (e.g., wireline or wireless network interface to base stations and/or entities in the core network), which may be operatively coupled with one or more connections 606 (e.g., buses, lines, fibers, links, etc.) to non-transitory computer readable medium 620 and memory 604. In certain example implementations, all or part of location server 600 may take the form of a chipset, and/or the like.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of location server 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in location server 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in location server 600 is merely exemplary, and as such the functionality of the modules and/or data structures may be combined, separated, and/or be structured in different ways depending upon the implementation of the location server 600.

The medium 620 and/or memory 604 may include a positioning session module 622 that when implemented by the one or more processors 602 configures the one or more processors 602 to engage in a positioning session with a UE through a serving base station via the external interface 616, including sending location service requests, such as a request for positioning capabilities, and a request of location information, such as positioning measurements, e.g., for a UE-assisted positioning process, or a position estimate, e.g., for a UE based positioning process. The one or more processors 602 are configured to receive responses to the location service requests, e.g. including receiving positioning capabilities and the requested location information from a UE. The one or more processors 602 may be configured to send and receive messages for a periodic location session. The one or more processors 602 maybe further configured to send assistance data. The one or more processors 602 may be further configured to determine a position estimate for the UE based on received positioning measurements, which as RxTx, AOA, TOA, RSRP, etc., or other types of measurements, such as using WiFi or SPS measurements.

The medium 620 and/or memory 604 may include a connection module 624 that when implemented by the one or more processors 602 configures the one or more processors 602 send a request to the base station, e.g. via the external interface 616, to suspend the connection between the base station and the UE, thereby placing the UE in an inactive state. The one or more processors 602 may be configured, for example, to request a connection suspension during a positioning session at least partially based on the time until positioning measurements are to be performed or positioning information transmitted to a location server. The one or more processors 602 may be further configured to determine data activity that is scheduled for the UE during a positioning session, wherein the request for connection suspension may be further based on the data activity. The one or more processors 602 may include with the request, the time duration during which position related messages between the UE and the location server are not expected may be a time for the UE to perform the positioning measurements. The one or more processors 602 may be configured to page the UE while the UE is in an inactive state, e.g. to indicate that the UE when positioning measurements are to be performed or when positioning information is to be sent to the location server. In some implementations, the one or more processors 602 may be configured to determine movement of the UE, e.g. based on positioning measurements, which may indicate that the UE is moving, and that a RAN update, e.g., handoff to another base station, may occur before the next positioning message is expected. The one or more processors 602 may be configured to send a request to the base station, e.g., via the external interface 616, to release the connection based on the movement, and may include an indication of the movement to the base station.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program code 608. For example, the non-transitory computer readable medium including program code 608 stored thereon may include program code 608 to support suspension of an RRC connection between the UE and a base station during a positioning session in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include an external interface 616 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable program code 608 stored thereon, which if executed by one or more processors 602 may be operatively enabled to perform all or portions of the example operations as described herein. Computer readable medium 620 may be a part of memory 604.

Figure 7:
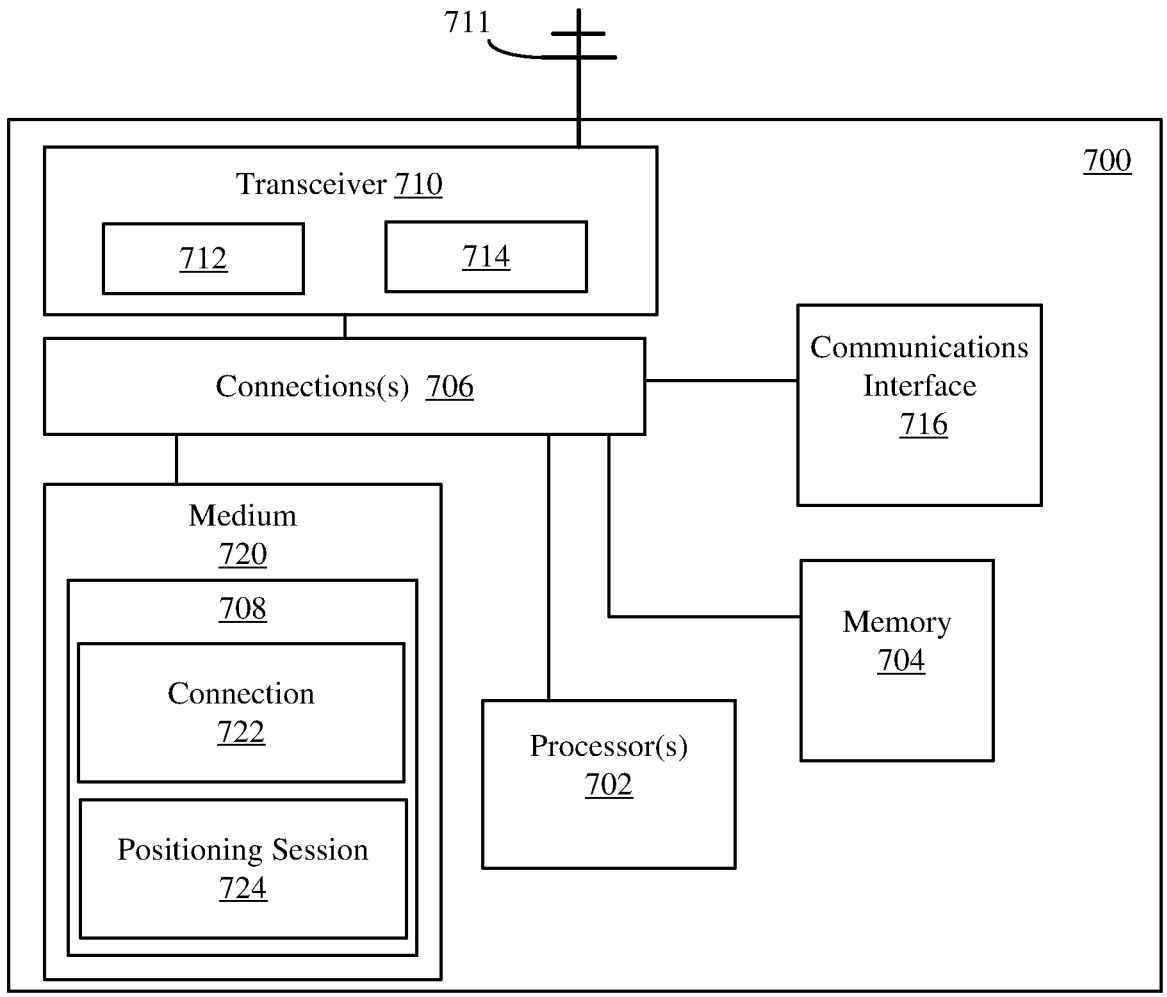
FIG. 7 shows a schematic block diagram illustrating certain exemplary features of a base station that is configured to that is configured to request suspension of the RRC connection with a UE during a positioning session.

FIG. 7 shows a schematic block diagram illustrating certain exemplary features of a base station 700, e.g., base station 110 in FIG. 1, enabled to support positioning of a UE and to request suspension and resumption of an RRC connection between the UE and the base station during the positioning session, as discussed herein. The base station 700 may be an eNB or gNB. The base station 700 may perform the process flow, e.g., shown in FIG. 10 and algorithms disclosed herein. Base station 700 may, for example, include one or more processors 702, memory 704, an external interface, which may include a wireless transceiver 710 (e.g., wireless network interface) and a communications interface 716 (e.g., wireline or wireless network interface to other base stations and/or entities in the core network such as a location server directly or via one or more intervening entities), which may be operatively coupled with one or more connections 706 (e.g., buses, lines, fibers, links, etc.) to non-transitory computer readable medium 720 and memory 704. The base station 700 may further include additional items, which are not shown, such as a user interface that may include e.g., a display, a keypad or other input device, such as virtual keypad on the display, through which a user may interface with the base station. In certain example implementations, all or part of base station 700 may take the form of a chipset, and/or the like. Wireless transceiver 710 may, for example, include a transmitter 712 enabled to transmit one or more signals over one or more types of wireless communication networks and a receiver 714 to receive one or more signals transmitted over the one or more types of wireless communication networks. The communications interface 716 may be a wired or wireless interface capable of connecting to other base stations in the RAN or network entities, such as a location server, e.g., LMF 152 or SLP 162 through various entities such as AMF 154 or UPF 158, shown in FIG. 1.

In some embodiments, base station 700 may include antenna 711, which may be internal or external. Antenna 711 may be used to transmit and/or receive signals processed by wireless transceiver 710. In some embodiments, antenna 711 may be coupled to wireless transceiver 710. In some embodiments, measurements of signals received (transmitted) by base station 700 may be performed at the point of connection of the antenna 711 and wireless transceiver 710. For example, the measurement point of reference for received (transmitted) RF signal measurements may be an input (output) terminal of the receiver 714 (transmitter 712) and an output (input) terminal of the antenna 711. In a base station 700 with multiple antennas 711 or antenna arrays, the antenna connector may be viewed as a virtual point representing the aggregate output (input) of multiple antennas. In some embodiments, base station 700 may measure received signals including signal strength and TOA measurements and the raw measurements may be processed by the one or more processors 702.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of base station 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in base station 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors. A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in base station 700 is merely exemplary, and as such the functionality of the modules and/or data structures may be combined, separated, and/or be structured in different ways depending upon the implementation of the base station 700.

The medium 720 and/or memory 704 may include a connection module 722 that when implemented by the one or more processors 702 configures the one or more processors 702 to send and receive messages to establish an RRC connection with a UE, via the wireless transceiver 710. The one or more processors 702 may be further configured to send receive request from an entity, such as the location server, e.g., via communication interface 716, or the UE, e.g. via the wireless transceiver, to suspend the connection between the base station and the UE, thereby placing the UE in an inactive state. The request, for example, may include the time duration during which position related messages between the UE and the location server are not expected may be a time for the UE to perform the positioning measurements. The one or more processors 702 may be configured, for example, to determine to suspend the connection with the UE at least partially based on the time until positioning measurements are to be performed or positioning information transmitted to a location server. The one or more processors 702 may be further configured to determine data activity that is scheduled for the UE during the positioning session, wherein the determination to suspend the connection may be further based on the data activity. While in the inactive state, the one or more processors 702 may be configured to store the UE connection context, e.g., AS context, e.g., in memory 704, which may be used to resume the connection. The one or more processors 702 may be configured to receive a request from the UE, e.g., via the wireless transceiver 710, to resume the connection, e.g. when positioning measurements are to be performed or when positioning information is to be sent to the location server, and to send a message to the UE to resume the connection using the UE connection context. In some implementations, the request may include a request to release the connection with the UE, e.g., if the UE is moving and a RAN update, e.g., handoff to another base station, may occur before the next positioning message is expected. The request may include, for example, an indication of movement of the UE. The one or more processors 702 may be configured to determine whether to release the connection with the UE.

The medium 720 and/or memory 704 may include a positioning session module 724 that when implemented by the one or more processors 702 configures the one or more processors 702 to engage in a positioning session with a UE and a location server, via the external interface (wireless transceiver 710 and communications interface 716). For example, the one or more processors 702 may be configured to receive location service request messages from the location server and forward the location service request messages to the UE, e.g., in LPP messages or SUPL messages. The one or more processors 702 is further configured to receive location service response messages from the UE and forward the location service response messages to the location server, e.g., in LPP messages or SUPL messages.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program code 708. For example, the non-transitory computer readable medium including program code 708 stored thereon may include program code 708 to support suspension of an RRC connection between the UE and a base station during a positioning session in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a wireless transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable program code 708 stored thereon, which if executed by one or more processors 702 may be operatively enabled to perform all or portions of the example operations as described herein. Computer readable medium 720 may be a part of memory 704.

Figure 8:
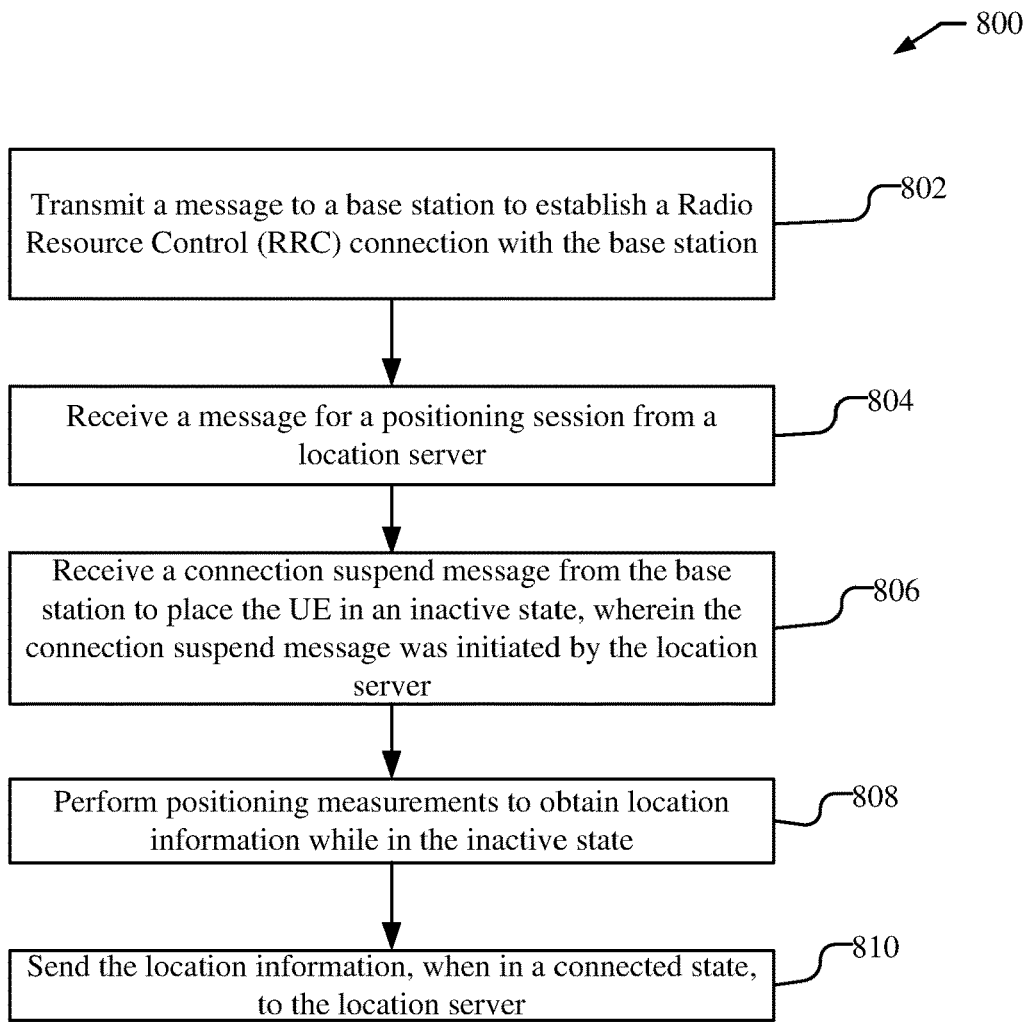
FIG. 8 shows a flowchart for an exemplary method for supporting location services for a UE performed by the UE with suspension of the RRC connection during the positioning session.

FIG. 8 shows a flowchart for an exemplary method 800 for supporting location services for a user equipment (UE), such as the UE 102 shown in FIG. 1, performed by the UE, in a manner consistent with disclosed implementations.

At block 802, the UE transmits a message to a base station to establish a Radio Resource Control (RRC) connection with the base station, e.g., as discussed at stage 1 of FIG. 3. A means for transmitting a message to a base station to establish a Radio Resource Control (RRC) connection with the base station may include, e.g., the wireless transceiver 510 and one or more processors 502 with dedicated hardware or implementing executable code or software instructions in memory 504 and/or medium 520 in UE 500, such as the connection module 522, shown in FIG. 5.

At block 804, the UE receives a message for a positioning session from a location server, e.g., as discussed at stages 3 and 4 of FIG. 3. A means for receiving a message for a positioning session from a location server may include, e.g., the wireless transceiver 510 and one or more processors 502 with dedicated hardware or implementing executable code or software instructions in memory 504 and/or medium 520 in UE 500, such as the positioning session module 524, shown in FIG. 5.

At block 806, the UE receives a connection suspend message from the base station to place the UE in an inactive state, wherein the connection suspend message was initiated by the location server, e.g., as discussed at stages 5 and 6 of FIG. 3. A means for receiving a connection suspend message from the base station to place the UE in an inactive state, wherein the connection suspend was initiated by the location server may include, e.g., the wireless transceiver 510 and one or more processors 502 with dedicated hardware or implementing executable code or software instructions in memory 504 and/or medium 520 in UE 500, such as the connection module 522, shown in FIG. 5.

At block 808, the UE performs positioning measurements to obtain location information while in the inactive state, e.g., as discussed at stage 8 of FIG. 3. A means for performing positioning measurements to obtain location information while in the inactive state may include, e.g., the wireless transceiver 510 and one or more processors 502 with dedicated hardware or implementing executable code or software instructions in memory 504 and/or medium 520 in UE 500, such as the positioning session module 524, shown in FIG. 5.

At block 810, the UE sends the location information, when in a connected state, to the location server, e.g., as discussed at stage 11 of FIG. 3. A means for sending the location information, when in a connected state, to the location server may include, e.g., the wireless transceiver 510 and one or more processors 502 with dedicated hardware or implementing executable code or software instructions in memory 504 and/or medium 520 in UE 500, such as the positioning session module 524, shown in FIG. 5.

In some implementations, the UE transitions from a connected state to the inactive state in response to the connection suspend message, e.g., as discussed at stage 6 of FIG. 3. A means for transitioning from a connected state to the inactive state in response to the connection suspend message may include, e.g., the wireless transceiver 510 and one or more processors 502 with dedicated hardware or implementing executable code or software instructions in memory 504 and/or medium 520 in UE 500, such as the connection module 522, shown in FIG. 5.

In some implementations, the UE may resume the connection with the base station to transition from the inactive state to the connected state. For example, in an implementation, the UE may transmit a connection resume request message to the base station when the location information is to be sent to the location server, e.g., as discussed at stage 9 of FIG. 3. The UE may receive a connection resume response message from the base station in response to the connection resume request message to transition from the inactive state to the connected state, e.g., as discussed at stage 10 of FIG. 3. A means for transmitting a connection resume request message to the base station when the location information is to be sent to the location server and a means for receiving a connection resume response message from the base station in response to the connection resume request message to transition from the inactive state to the connected state may include, e.g., the wireless transceiver 510 and one or more processors 502 with dedicated hardware or implementing executable code or software instructions in memory 504 and/or medium 520 in UE 500, such as the connection module 522, shown in FIG. 5.

In one implementation, the location server may determine a time for performing the positioning measurements and initiate the connection suspend message at least partially based on the time for performing the positioning measurements, e.g., as discussed at stage 5 of FIG. 3. A means for determining a time for performing the positioning measurements after receiving the request for location information from the location server may include, e.g., the wireless transceiver 510 and one or more processors 502 with dedicated hardware or implementing executable code or software instructions in memory 504 and/or medium 520 in UE 500, such as the connection module 522 and the positioning session module 524, shown in FIG. 5.

In one implementation, the location server initiates the connection suspend message by providing to the base station an indication of a time duration during which position related messages between the UE and the location server are not expected, e.g., as discussed at stage 5 of FIG. 3. For example, the time duration during which position related messages between the UE and the location server are not expected may be a time for the UE to perform the positioning measurements. For example, the time duration during which position related messages between the UE and the location server are not expected is based on a measurement periodicity. In one example, the position related messages between the UE and the location server that are not expected during the time duration comprise positioning measurement messages to the location server. In one implementation, the base station sends the connection suspend message based on the indication of the time duration, e.g., as discussed at stage 6 of FIG. 3.

In one implementation, the UE may store a UE connection context while in the inactive state, wherein the base station stores the UE connection context while the UE is in the inactive state, and may resume the RRC connection with the base station based on the UE connection context, e.g., as discussed at stages 6, 9 and 10 of FIG. 3. A means for storing a UE connection context while in the inactive state, wherein the base station stores the UE connection context while the UE is in the inactive state, and a means for resuming the connection with the base station is based on the UE connection context may include, e.g., the wireless transceiver 510 and one or more processors 502 with dedicated hardware or implementing executable code or software instructions in memory 504 and/or medium 520 in UE 500, such as the connection module 522, shown in FIG. 5.

Figure 9:
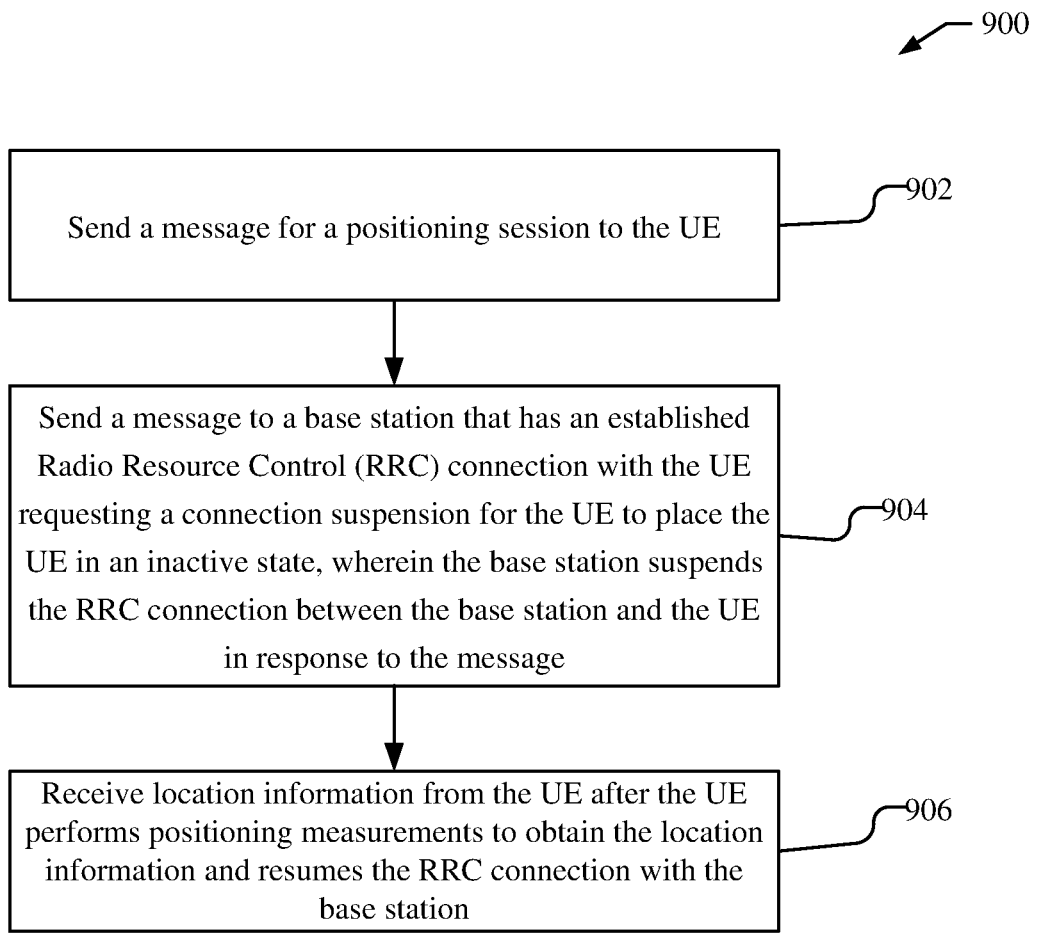
FIG. 9 shows a flowchart for an exemplary method for supporting location services for a UE performed by the location server with suspension of the RRC connection during the positioning session.

FIG. 9 shows a flowchart for an exemplary method 900 for supporting location services for a user equipment (UE), such as the UE 102 shown in FIG. 1, performed by a location server, such as LMF 152 or SLP 162 shown in FIG. 1, in a manner consistent with disclosed implementations.

At block 902, the location server sends a message for a positioning session to the UE, e.g., as discussed at stages 3 and 4 of FIG. 3. A means for sending a message for a positioning session to the UE may include, e.g., the external interface 616 and one or more processors 602 with dedicated hardware or implementing executable code or software instructions in memory 604 and/or medium 620 in location server 600, such as the positioning session module 622, shown in FIG. 6.

At block 904, the location server sends a message to a base station that has an established Radio Resource Control (RRC) connection with the UE requesting a connection suspension for the UE to place the UE in an inactive state, wherein the base station suspends the RRC connection between the base station and the UE in response to the message, e.g., as discussed at stage 5 of FIG. 3. A means for sending a message to a base station that has an established Radio Resource Control (RRC) connection with the UE requesting a connection suspension for the UE to place the UE in an inactive state, wherein the base station suspends the RRC connection between the base station and the UE in response to the message may include, e.g., the external interface 616 and one or more processors 602 with dedicated hardware or implementing executable code or software instructions in memory 604 and/or medium 620 in location server 600, such as the connection module 624, shown in FIG. 6.

At block 906, the location server receives location information from the UE after the UE performs positioning measurements to obtain the location information and resumes the RRC connection with the base station, e.g., as discussed at stage 11 of FIG. 3. A means for receiving location information from the UE after the UE performs positioning measurements to obtain the location information and resumes the RRC connection with the base station may include, e.g., the external interface 616 and one or more processors 602 with dedicated hardware or implementing executable code or software instructions in memory 604 and/or medium 620 in location server 600, such as the positioning session module 622, shown in FIG. 6.

In one implementation, the message to the base station to request the connection suspension may include a recommendation to suspend the RRC connection with the UE, e.g., as discussed at stage 5 of FIG. 3. In one implementation, the message to the base station to request the connection suspension comprises an indication of a time duration during which position related messages between the UE and the location server are not expected, e.g., as discussed at stage 5 of FIG. 3. For example, the time duration during which position related messages between the UE and the location server are not expected may be a time for the UE to perform the positioning measurements. For example, the time duration during which position related messages between the UE and the location server are not expected is based on a measurement periodicity. In one example, the position related messages between the UE and the location server that are not expected during the time duration may be positioning measurement messages from the UE. In one example, the position related messages between the UE and the location server that are not expected during the time duration may be positioning related requests to the UE. In one implementation, the base station suspends the RRC connection between the base station and the UE based on the indication of the time duration, e.g., as discussed at stage 6 of FIG. 3.

In one implementation, the UE transitions from a connected state to the inactive state in response to the base station suspending the RRC connection between the base station and the UE, wherein the UE stores a UE connection context while in the inactive state and the base station stores the UE connection context, and wherein the UE connection context is used to resume the RRC connection between the UE and the base station, e.g., as discussed at stage 6 of FIG. 3.

Figure 10:
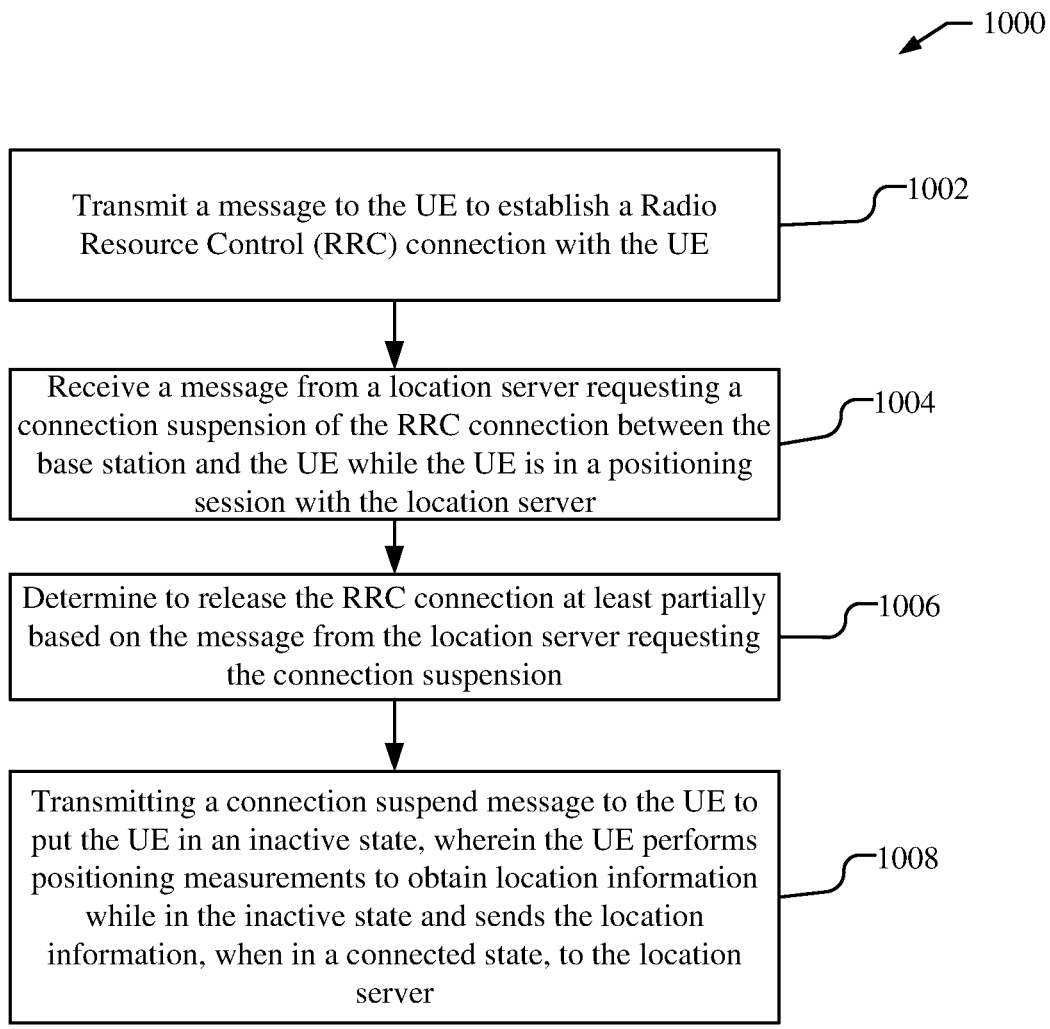
FIG. 10 shows a flowchart for an exemplary method for supporting location services for a UE performed by the base station with suspension of the RRC connection during the positioning session.

FIG. 10 shows a flowchart for an exemplary method 1000 for supporting location services for a user equipment (UE), such as the UE 102 shown in FIG. 1, performed by a base station, such as gNB 110 shown in FIG. 1, in a manner consistent with disclosed implementations.

At block 1002, the base station transmits a message to the UE to establish a Radio Resource Control (RRC) connection with the UE, e.g., as discussed at stage 2 of FIG. 3. A means for transmitting a message to the UE to establish a Radio Resource Control (RRC) connection with the UE may include, e.g., the wireless transceiver 710 or communications interface 716 and one or more processors 702 with dedicated hardware or implementing executable code or software instructions in memory 704 and/or medium 720 in base station 700, such as the connection module 722, shown in FIG. 7.

At block 1004, the base station receives a message from a location server requesting a connection suspension of the RRC connection between the base station and the UE while the UE is in a positioning session with the location server, e.g., as discussed at stage 5 of FIG. 3. A means for receiving a message from an location server requesting a connection suspension of the connection between the base station and the UE while the UE is in a positioning session with a location server may include, e.g., the wireless transceiver 710 or communications interface 716 and one or more processors 702 with dedicated hardware or implementing executable code or software instructions in memory 704 and/or medium 720 in base station 700, such as the connection module 722, shown in FIG. 7.

At block 1006, the base station determines to release the RRC connection at least partially based on the message from the location server requesting the connection suspension, e.g., as discussed at stage 6 of FIG. 3. A means for determining to release the RRC connection at least partially based on the message from the location server requesting the connection suspension may include, e.g., the wireless transceiver 710 or communications interface 716 and one or more processors 702 with dedicated hardware or implementing executable code or software instructions in memory 704 and/or medium 720 in base station 700, such as the connection module 722, shown in FIG. 7.

At block 1008, the base station transmits a connection suspend message to the UE to put the UE in an inactive state, wherein the UE performs positioning measurements to obtain location information while in the inactive state and sends the location information, when in a connected state, to the location server, e.g., as discussed at stages 6, 8, and 11 of FIG. 3. A means for transmitting a connection suspend message to the UE to put the UE in an inactive state, wherein the UE performs positioning measurements to obtain location information while in the inactive state and sends the location information, when in a connected state, to the location server may include, e.g., the wireless transceiver 710 or communications interface 716 and one or more processors 702 with dedicated hardware or implementing executable code or software instructions in memory 704 and/or medium 720 in base station 700, such as the connection module 722, shown in FIG. 7.

In one implementation, the base station may determine data activity scheduled for the UE while the UE performs positioning measurements, wherein determining to release the RRC connection is further in response to the data activity, e.g., as discussed at stage 6 of FIG. 3. A means for determining data activity scheduled for the UE while the UE performs positioning measurements, wherein determining to release the RRC connection is further in response to the data activity may include, e.g., the wireless transceiver 710 or communications interface 716 and one or more processors 702 with dedicated hardware or implementing executable code or software instructions in memory 704 and/or medium 720 in base station 700, such as the connection module 722, shown in FIG. 7.

In one implementation, the message from the location server requesting the connection suspension comprises a recommendation to suspend the RRC connection with the UE, e.g., as discussed at stage 5 of FIG. 3. For example, the message from the location server requesting the connection suspension may include an indication of a time duration during which position related messages between the UE and the location server are not expected, e.g., as discussed at stage 5 of FIG. 3. For example, the time duration during which position related messages between the UE and the location server are not expected may be a time for the UE to perform positioning measurements. For example, the time duration during which position related messages between the UE and the location server are not expected is based on a measurement periodicity. In one implementation, the position related messages between the UE and the location server that are not expected during the time duration may be positioning measurement messages from the UE. For example, the position related messages between the UE and the location server that are not expected during the time duration may be positioning related requests from the location server. In one implementation, the base station may determine to release the RRC connection at least partially based on the indication of the time duration, e.g., as discussed at stage 6 of FIG. 3.

In one implementation, the base station may receive a connection resume request message from the UE when the UE is prepared to send location information to the location server, e.g., as discussed at stage 9 of FIG. 3. A means for receiving a connection resume request message from the UE when the UE is prepared to send location information to the location server may include, e.g., the wireless transceiver 710 or communications interface 716 and one or more processors 702 with dedicated hardware or implementing executable code or software instructions in memory 704 and/or medium 720 in base station 700, such as the connection module 722, shown in FIG. 7. The base station may transmit a connection resume response message to the UE in response to the connection resume request message, wherein the UE transitions from the inactive state to the connected state and sends the location information to the location server, e.g., as discussed at stage 10 of FIG. 3. A means for transmitting a connection resume response message to the UE in response to the connection resume request message, wherein the UE transitions from the inactive state to the connected state and sends the location information to the location server may include, e.g., the wireless transceiver 710 or communications interface 716 and one or more processors 702 with dedicated hardware or implementing executable code or software instructions in memory 704 and/or medium 720 in base station 700, such as the connection module 722, shown in FIG. 7.

In one implementation, the base station may store a UE connection context while the UE is in the inactive state, wherein the UE stores the UE connection context while the UE is in the inactive state; and resume the RRC connection with the UE based on the UE connection context, e.g., as discussed at stages 6, 9, and 10 of FIG. 3. A means for storing the UE connection context while the UE is in the inactive state; and resuming the RRC connection with the UE based on the UE connection context may include, e.g., the wireless transceiver 710 or communications interface 716 and one or more processors 702 with dedicated hardware or implementing executable code or software instructions in memory 704 and/or medium 720 in base station 700, such as the connection module 722, shown in FIG. 7.

In one implementation, the base station releases the RRC connection between the base station and the UE to place the UE in the idle state when the UE is in a high mobility state and suspends the RRC connection between the base station and the UE to place the UE in the inactive state when the UE is in a low mobility state, e.g., as discussed at stages 5 and 6 of FIG. 3.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In view of this description embodiments may include different combinations of features. Implementation examples are described in the following numbered clauses:

Clause 1. A method performed by a user equipment (UE) for supporting location services for the UE, comprising: transmitting a message to a base station to establish a Radio Resource Control (RRC) connection with the base station; receiving a message for a positioning session from a location server; receiving a connection suspend message from the base station to place the UE in an inactive state, wherein the connection suspend message was initiated by the location server; performing positioning measurements to obtain location information while in the inactive state; and sending the location information, when in a connected state, to the location server.

Clause 2. The method of clause 1, further comprising: transmitting a connection resume request message to the base station when the location information is to be sent to the location server; and receiving a connection resume response message from the base station in response to the connection resume request message to transition from the inactive state to the connected state.

Clause 3. The method of any of clauses 1-2, wherein the location server determines a time for performing the positioning measurements and initiates the connection suspend message at least partially based on the time for performing the positioning measurements.

Clause 4. The method of any of clauses 1-3, wherein the location server initiates the connection suspend message by providing to the base station an indication of a time duration during which position related messages between the UE and the location server are not expected.

Clause 5. The method of clause 4, wherein the time duration during which the position related messages between the UE and the location server are not expected comprises a time for the UE to perform the positioning measurements.

Clause 6. The method of any of clauses 4-5, wherein the time duration during which the position related messages between the UE and the location server are not expected is based on a measurement periodicity.

Clause 7. The method of any of clauses 4-6, wherein the position related messages between the UE and the location server that are not expected during the time duration comprise positioning measurement messages to the location server.

Clause 8. The method of any of clauses 4-7, wherein the base station sends the connection suspend message based on the indication of the time duration.

Clause 9. The method of any of clauses 1-8, further comprising: storing a UE connection context while in the inactive state, wherein the base station stores the UE connection context while the UE is in the inactive state; and resuming the RRC connection with the base station based on the UE connection context.

Clause 10. A user equipment (UE) configured for supporting location services for the UE, comprising: a wireless transceiver configured to wirelessly communicate with entities in a wireless network; at least one memory; at least one processor coupled to the wireless transceiver and the at least one memory, wherein the at least one processor is configured to: transmit, via the wireless transceiver, a message to a base station to establish a Radio Resource Control (RRC) connection with the base station; receive, via the wireless transceiver, a message for a positioning session from a location server; receive, via the wireless transceiver, a connection suspend message from the base station to place the UE in an inactive state, wherein the connection suspend message was initiated by the location server; perform positioning measurements to obtain location information while in the inactive state; and send the location information, when in a connected state, to the location server.

Clause 11. The UE of clause 10, wherein the at least one processor is further configured to: transmit, via the wireless transceiver, a connection resume request message to the base station when the location information is to be sent to the location server; and receive, via the wireless transceiver, a connection resume response message from the base station in response to the connection resume request message to transition from the inactive state to the connected state.

Clause 12. The UE of any of clauses 10-11, wherein the location server determines a time for performing the positioning measurements and initiates the connection suspend message at least partially based on the time for performing the positioning measurements.

Clause 13. The UE of any of clauses 10-12, wherein the location server initiates the connection suspend message by providing to the base station an indication of a time duration during which position related messages between the UE and the location server are not expected.

Clause 14. The UE of clause 13, wherein the time duration during which the position related messages between the UE and the location server are not expected comprises a time for the UE to perform the positioning measurements.

Clause 15. The UE of any of clauses 13-14, wherein the time duration during which the position related messages between the UE and the location server are not expected is based on a measurement periodicity.

Clause 16. The UE of any of clauses 13-15, wherein the position related messages between the UE and the location server that are not expected during the time duration comprise positioning measurement messages to the location server.

Clause 17. The UE of any of clauses 13-16, wherein the base station sends the connection suspend message based on the indication of the time duration.

Clause 18. The UE of any of clauses 10-17, wherein the at least one processor is further configured to: store a UE connection context while in the inactive state, wherein the base station stores the UE connection context while the UE is in the inactive state; and resume the RRC connection with the base station based on the UE connection context.

Clause 19. A user equipment (UE) configured for supporting location services for the UE, comprising: means for transmitting a message to a base station to establish a Radio Resource Control (RRC) connection with the base station; means for receiving a message for a positioning session from a location server; means for receiving a connection suspend message from the base station to place the UE in an inactive state, wherein the connection suspend message was initiated by the location server; means for performing positioning measurements to obtain location information while in the inactive state; and means for sending the location information, when in a connected state, to the location server.

Clause 20. The UE of clause 19, further comprising: means for transmitting a connection resume request message to the base station when the location information is to be sent to the location server; and means for receiving a connection resume response message from the base station in response to the connection resume request message to transition from the inactive state to the connected state.

Clause 21. The UE of any of clauses 19-20, wherein the location server determines a time for performing the positioning measurements and initiates the connection suspend message at least partially based on the time for performing the positioning measurements.

Clause 22. The UE of any of clauses 19-21, wherein the location server initiates the connection suspend message by providing to the base station an indication of a time duration during which position related messages between the UE and the location server are not expected.

Clause 23. The UE of clause 22, wherein the time duration during which the position related messages between the UE and the location server are not expected comprises a time for the UE to perform the positioning measurements.

Clause 24. The UE of any of clauses 22-23, wherein the time duration during which the position related messages between the UE and the location server are not expected is based on a measurement periodicity.

Clause 25. The UE of any of clauses 22-24, wherein the position related messages between the UE and the location server that are not expected during the time duration comprise positioning measurement messages to the location server.

Clause 26. The UE of any of clauses 22-25, wherein the base station sends the connection suspend message based on the indication of the time duration.

Clause 27. The UE of any of clauses 19-26, further comprising: means for storing a UE connection context while in the inactive state, wherein the base station stores the UE connection context while the UE is in the inactive state; and means for resuming the RRC connection with the base station based on the UE connection context.

Clause 28. A non-transitory storage medium including program code stored thereon, the program code is operable to configure at least one processor in a user equipment (UE) for supporting location services for the UE, the program code comprising instructions to: transmit a message to a base station to establish a Radio Resource Control (RRC) connection with the base station; receive a message for a positioning session from a location server; receive a connection suspend message from the base station to place the UE in an inactive state, wherein the connection suspend message was initiated by the location server; perform positioning measurements to obtain location information while in the inactive state; and send the location information, when in a connected state, to the location server.

Clause 29. The non-transitory storage medium of clause 28, wherein the program code further comprises instructions to: transmit a connection resume request message to the base station when the location information is to be sent to the location server; and receive a connection resume response message from the base station in response to the connection resume request message to transition from the inactive state to the connected state.

Clause 30. The non-transitory storage medium of any of clauses 28-29, wherein the location server determines a time for performing the positioning measurements and initiates the connection suspend message at least partially based on the time for performing the positioning measurements.

Clause 31. The non-transitory storage medium of any of clauses 28-30, wherein the location server initiates the connection suspend message by providing to the base station an indication of a time duration during which position related messages between the UE and the location server are not expected.

Clause 32. The non-transitory storage medium of clause 31, wherein the time duration during which the position related messages between the UE and the location server are not expected comprises a time for the UE to perform the positioning measurements.

Clause 33. The non-transitory storage medium of any of clauses 31-32, wherein the time duration during which the position related messages between the UE and the location server are not expected is based on a measurement periodicity.

Clause 34. The non-transitory storage medium of any of clauses 31-33, wherein the position related messages between the UE and the location server that are not expected during the time duration comprise positioning measurement messages to the location server.

Clause 35. The non-transitory storage medium of any of clauses 31-34, wherein the base station sends the connection suspend message based on the indication of the time duration.

Clause 36. The non-transitory storage medium of any of clauses 28-35, wherein the program code further comprises instructions to: store a UE connection context while in the inactive state, wherein the base station stores the UE connection context while the UE is in the inactive state; and resume the RRC connection with the base station based on the UE connection context.

Clause 37. A method performed by a location server for supporting location services for a user equipment (UE), comprising: sending a message for a positioning session to the UE; sending a message to a base station that has an established Radio Resource Control (RRC) connection with the UE requesting a connection suspension for the UE to place the UE in an inactive state, wherein the base station suspends the RRC connection between the base station and the UE in response to the message; and receiving location information from the UE after the UE performs positioning measurements to obtain the location information and resumes the RRC connection with the base station.

Clause 38. The method of clause 37, wherein the message to the base station to request the connection suspension comprises a recommendation to suspend the RRC connection with the UE.

Clause 39. The method of any of clauses 37-38, wherein the message to the base station to request the connection suspension comprises an indication of a time duration during which position related messages between the UE and the location server are not expected.

Clause 40. The method of clause 39, wherein the time duration during which the position related messages between the UE and the location server are not expected comprises a time for the UE to perform the positioning measurements.

Clause 41. The method of any of clauses 39-40, wherein the time duration during which the position related messages between the UE and the location server are not expected is based on a measurement periodicity.

Clause 42. The method of any of clauses 39-41, wherein the position related messages between the UE and the location server that are not expected during the time duration comprise positioning measurement messages from the UE.

Clause 43. The method of any of clauses 39-42, wherein the position related messages between the UE and the location server that are not expected during the time duration comprise positioning related requests to the UE.

Clause 44. The method of any of clauses 39-43, wherein the base station suspends the RRC connection between the base station and the UE based on the indication of the time duration.

Clause 45. The method of any of clauses 37-44, wherein the UE transitions from a connected state to the inactive state in response to the base station suspending the RRC connection between the base station and the UE, wherein the UE stores a UE connection context while in the inactive state and the base station stores the UE connection context, and wherein the UE connection context is used to resume the RRC connection between the UE and the base station.

Clause 46. A location server configured for supporting location services for a user equipment (UE) comprising: an external interface configured to communicate with one or more base stations, and one or more UEs; at least one memory; at least one processor coupled to the external interface and the at least one memory, wherein the at least one processor is configured to: send, via the external interface, a message for a positioning session to the UE; send, via the external interface, a message to a base station that has an established Radio Resource Control (RRC) connection with the UE requesting a connection suspension for the UE to place the UE in an inactive state, wherein the base station suspends the RRC connection between the base station and the UE in response to the message; and receive, via the external interface, location information from the UE after the UE performs positioning measurements to obtain the location information and resumes the RRC connection with the base station.

Clause 47. The location server of clause 46, wherein the message to the base station to request the connection suspension comprises a recommendation to suspend the RRC connection with the UE.

Clause 48. The location server of any of clauses 46-47, wherein the message to the base station to request the connection suspension comprises an indication of a time duration during which position related messages between the UE and the location server are not expected.

Clause 49. The location server of clause 48, wherein the time duration during which the position related messages between the UE and the location server are not expected comprises a time for the UE to perform the positioning measurements.

Clause 50. The location server of any of clauses 48-49, wherein the time duration during which the position related messages between the UE and the location server are not expected is based on a measurement periodicity.

Clause 51. The location server of any of clauses 48-50, wherein the position related messages between the UE and the location server that are not expected during the time duration comprise positioning measurement messages from the UE.

Clause 52. The location server of any of clauses 48-51, wherein the position related messages between the UE and the location server that are not expected during the time duration comprise positioning related requests to the UE.

Clause 53. The location server of any of clauses 48-52, wherein the base station suspends the RRC connection between the base station and the UE based on the indication of the time duration.

Clause 54. The location server of any of clauses 46-53, wherein the UE transitions from a connected state to the inactive state in response to the base station suspending the RRC connection between the base station and the UE, wherein the UE stores a UE connection context while in the inactive state and the base station stores the UE connection context, and wherein the UE connection context is used to resume the RRC connection between the UE and the base station.

Clause 55. A location server configured for supporting location services for a user equipment (UE), comprising: means for sending a message for a positioning session to the UE; means for sending a message to a base station that has an established Radio Resource Control (RRC) connection with the UE requesting a connection suspension for the UE to place the UE in an inactive state, wherein the base station suspends the RRC connection between the base station and the UE in response to the message; and means for receiving location information from the UE after the UE performs positioning measurements to obtain the location information and resumes the RRC connection with the base station.

Clause 56. The location server of clause 55, wherein the message to the base station to request the connection suspension comprises a recommendation to suspend the RRC connection with the UE.

Clause 57. The location server of any of clauses 55-56, wherein the message to the base station to request the connection suspension comprises an indication of a time duration during which position related messages between the UE and the location server are not expected.

Clause 58. The location server of clause 57, wherein the time duration during which the position related messages between the UE and the location server are not expected comprises a time for the UE to perform the positioning measurements.

Clause 59. The location server of any of clauses 57-58, wherein the time duration during which the position related messages between the UE and the location server are not expected is based on a measurement periodicity.

Clause 60. The location server of any of clauses 57-59, wherein the position related messages between the UE and the location server that are not expected during the time duration comprise positioning measurement messages from the UE.

Clause 61. The location server of any of clauses 57-60, wherein the position related messages between the UE and the location server that are not expected during the time duration comprise positioning related requests to the UE.

Clause 62. The location server of any of clauses 57-61, wherein the base station suspends the RRC connection between the base station and the UE based on the indication of the time duration.

Clause 63. The location server of any of clauses 55-62, wherein the UE transitions from a connected state to the inactive state in response to the base station suspending the RRC connection between the base station and the UE, wherein the UE stores a UE connection context while in the inactive state and the base station stores the UE connection context, and wherein the UE connection context is used to resume the RRC connection between the UE and the base station.

Clause 64. A non-transitory storage medium including program code stored thereon, the program code is operable to configure at least one processor in a location server for supporting location services for a user equipment (UE), the program code comprising instructions to: send a message for a positioning session to the UE; send a message to a base station that has an established Radio Resource Control (RRC) connection with the UE requesting a connection suspension for the UE to place the UE in an inactive state, wherein the base station suspends the RRC connection between the base station and the UE in response to the message; and receive location information from the UE after the UE performs positioning measurements to obtain the location information and resumes the RRC connection with the base station.

Clause 65. The non-transitory storage medium of clause 64, wherein the message to the base station to request the connection suspension comprises a recommendation to suspend the RRC connection with the UE.

Clause 66. The non-transitory storage medium of any of clauses 64-65, wherein the message to the base station to request the connection suspension comprises an indication of a time duration during which position related messages between the UE and the location server are not expected.

Clause 67. The non-transitory storage medium of clause 66, wherein the time duration during which the position related messages between the UE and the location server are not expected comprises a time for the UE to perform the positioning measurements.

Clause 68. The non-transitory storage medium of any of clauses 66-67, wherein the time duration during which the position related messages between the UE and the location server are not expected is based on a measurement periodicity.

Clause 69. The non-transitory storage medium of any of clauses 66-68, wherein the position related messages between the UE and the location server that are not expected during the time duration comprise positioning measurement messages from the UE.

Clause 70. The non-transitory storage medium of any of clauses 66-69, wherein the position related messages between the UE and the location server that are not expected during the time duration comprise positioning related requests to the UE.

Clause 71. The non-transitory storage medium of any of clauses 66-70, wherein the base station suspends the RRC connection between the base station and the UE based on the indication of the time duration.

Clause 72. The non-transitory storage medium of any of clauses 64-71, wherein the UE transitions from a connected state to the inactive state in response to the base station suspending the RRC connection between the base station and the UE, wherein the UE stores a UE connection context while in the inactive state and the base station stores the UE connection context, and wherein the UE connection context is used to resume the RRC connection between the UE and the base station.

Clause 73. A method performed by a base station for supporting location services for a user equipment (UE), comprising: transmitting a message to the UE to establish a Radio Resource Control (RRC) connection with the UE; receiving a message from a location server requesting a connection suspension of the RRC connection between the base station and the UE while the UE is in a positioning session with the location server; determining to release the RRC connection at least partially based on the message from the location server requesting the connection suspension; and transmitting a connection suspend message to the UE to put the UE in an inactive state, wherein the UE performs positioning measurements to obtain location information while in the inactive state and sends the location information, when in a connected state, to the location server.

Clause 74. The method of clause 73, further comprising determining data activity scheduled for the UE while the UE performs positioning measurements, wherein determining to release the RRC connection is further in response to the data activity.

Clause 75. The method of any of clauses 73-74, wherein the message from the location server requesting the connection suspension comprises a recommendation to suspend the RRC connection with the UE.

Clause 76. The method of any of clauses 73-75, wherein the message from the location server requesting the connection suspension comprises an indication of a time duration during which position related messages between the UE and the location server are not expected.

Clause 77. The method of clause 76, wherein the time duration during which the position related messages between the UE and the location server are not expected comprises a time for the UE to perform positioning measurements.

Clause 78. The method of any of clauses 76-77, wherein the time duration during which the position related messages between the UE and the location server are not expected is based on a measurement periodicity.

Clause 79. The method of any of clauses 76-78, wherein the position related messages between the UE and the location server that are not expected during the time duration comprise positioning measurement messages from the UE.

Clause 80. The method of any of clauses 76-79, wherein the position related messages between the UE and the location server that are not expected during the time duration comprise positioning related requests from the location server.

Clause 81. The method of any of clauses 76-80, wherein determining to release the RRC connection is at least partially based on the indication of the time duration.

Clause 82. The method of any of clauses 73-81, further comprising: receiving a connection resume request message from the UE when the UE is prepared to send the location information to the location server; and transmitting a connection resume response message to the UE in response to the connection resume request message, wherein the UE transitions from the inactive state to the connected state and sends the location information to the location server.

Clause 83. The method of any of clauses 73-82, further comprising: storing a UE connection context while the UE is in the inactive state, wherein the UE stores the UE connection context while the UE is in the inactive state; and resuming the RRC connection with the UE based on the UE connection context.

Clause 84. The method of any of clauses 73-83, wherein the message from the location server requesting the connection suspension further comprises a recommendation to release the RRC connection to place the UE in an idle state based on a mobility state of the UE.

Clause 85. The method of clause 84, wherein the base station releases the RRC connection between the base station and the UE to place the UE in the idle state when the UE is in a high mobility state and suspends the RRC connection between the base station and the UE to place the UE in the inactive state when the UE is in a low mobility state.

Clause 86. A base station configured for supporting location services for a user equipment (UE) comprising: an external interface configured to communicate with a location server and one or more UEs in a wireless network; at least one memory; at least one processor coupled to the external interface and the at least one memory, wherein the at least one processor is configured to: transmit, via the external interface, a message to the UE to establish a Radio Resource Control (RRC) connection with the UE; receive, via the external interface, a message from the location server requesting a connection suspension of the RRC connection between the base station and the UE while the UE is in a positioning session with the location server; determine to release the RRC connection at least partially based on the message from the location server requesting the connection suspension; and transmit, via the external interface, a connection suspend message to put the UE in an inactive state, wherein the UE performs positioning measurements to obtain location information while in the inactive state and sends the location information, when in a connected state, to the location server.

Clause 87. The base station of clause 86, wherein the at least one processor is further configured to determine data activity scheduled for the UE while the UE performs positioning measurements, wherein the at least one processor is configured to determine to release the RRC connection further in response to the data activity.

Clause 88. The base station of any of clauses 86-87, wherein the message from the location server requesting the connection suspension comprises a recommendation to suspend the RRC connection with the UE.

Clause 89. The base station of any of clauses 86-88, wherein the message from the location server requesting the connection suspension comprises an indication of a time duration during which position related messages between the UE and the location server are not expected.

Clause 90. The base station of clause 89, wherein the time duration during which the position related messages between the UE and the location server are not expected comprises a time for the UE to perform positioning measurements.

Clause 91. The base station of any of clauses 89-90, wherein the time duration during which the position related messages between the UE and the location server are not expected is based on a measurement periodicity.

Clause 92. The base station of any of clauses 89-91, wherein the position related messages between the UE and the location server that are not expected during the time duration comprise positioning measurement messages from the UE.

Clause 93. The base station of any of clauses 89-92, wherein the position related messages between the UE and the location server that are not expected during the time duration comprise positioning related requests from the location server.

Clause 94. The base station of any of clauses 89-93, wherein determining to release the RRC connection is at least partially based on the indication of the time duration.

Clause 95. The base station of any of clauses 86-94, wherein the at least one processor is further configured to: receive, via the external interface, a connection resume request message from the UE when the UE is prepared to send the location information to the location server; and transmit, via the external interface, a connection resume response message to the UE in response to the connection resume request message, wherein the UE transitions from the inactive state to the connected state and sends the location information to the location server.

Clause 96. The base station of any of clauses 86-95, wherein the at least one processor is further configured to: store a UE connection context while the UE is in the inactive state, wherein the UE stores the UE connection context while the UE is in the inactive state; and resume the RRC connection with the UE based on the UE connection context.

Clause 97. The base station of any of clauses 86-96, wherein the message from the location server requesting the connection suspension further comprises a recommendation to release the RRC connection to place the UE in an idle state based on a mobility state of the UE.

Clause 98. The base station of clause 97, wherein the base station releases the RRC connection between the base station and the UE to place the UE in the idle state when the UE is in a high mobility state and suspends the RRC connection between the base station and the UE to place the UE in the inactive state when the UE is in a low mobility state.

Clause 99. A base station for supporting location services for a user equipment (UE), comprising: means for transmitting a message to the UE to establish a Radio Resource Control (RRC) connection with the UE; means for receiving a message from a location server requesting a connection suspension of the RRC connection between the base station and the UE while the UE is in a positioning session with the location server; means for determining to release the RRC connection at least partially based on the message from the location server requesting the connection suspension; and means for transmitting a connection suspend message to the UE to put the UE in an inactive state, wherein the UE performs positioning measurements to obtain location information while in the inactive state and sends the location information, when in a connected state, to the location server.

Clause 100. The base station of clause 99, further comprising means for determining data activity scheduled for the UE while the UE performs positioning measurements, wherein the means for determining to release the RRC connection determines to release the RRC connection further in response to the data activity.

Clause 101. The base station of any of clauses 99-100, wherein the message from the location server requesting the connection suspension comprises a recommendation to suspend the RRC connection with the UE.

Clause 102. The base station of any of clauses 99-101, wherein the message from the location server requesting the connection suspension comprises an indication of a time duration during which position related messages between the UE and the location server are not expected.

Clause 103. The base station of clause 102, wherein the time duration during which the position related messages between the UE and the location server are not expected comprises a time for the UE to perform positioning measurements.

Clause 104. The base station of any of clauses 102-103, wherein the time duration during which the position related messages between the UE and the location server are not expected is based on a measurement periodicity.

Clause 105. The base station of any of clauses 102-104, wherein the position related messages between the UE and the location server that are not expected during the time duration comprise positioning measurement messages from the UE.

Clause 106. The base station of any of clauses 102-15, wherein the position related messages between the UE and the location server that are not expected during the time duration comprise positioning related requests from the location server.

Clause 107. The base station of any of clauses 102-106, wherein the means for determining to release the RRC connection determines to release the RRC connection at least partially based on the indication of the time duration.

Clause 108. The base station of any of clauses 99-107, further comprising: means for receiving a connection resume request message from the UE when the UE is prepared to send the location information to the location server; and means for transmitting a connection resume response message to the UE in response to the connection resume request message, wherein the UE transitions from the inactive state to the connected state and sends the location information to the location server.

Clause 109. The base station of any of clauses 99-108, further comprising: means for storing a UE connection context while the UE is in the inactive state, wherein the UE stores the UE connection context while the UE is in the inactive state; and means for resuming the RRC connection with the UE based on the UE connection context.

Clause 110. The base station of any of clauses 99-109, wherein the message from the location server requesting the connection suspension further comprises a recommendation to release the RRC connection to place the UE in an idle state based on a mobility state of the UE.

Clause 111. The base station of clause 110, wherein the base station releases the RRC connection between the base station and the UE to place the UE in the idle state when the UE is in a high mobility state and suspends the RRC connection between the base station and the UE to place the UE in the inactive state when the UE is in a low mobility state.

Clause 112. A non-transitory storage medium including program code stored thereon, the program code is operable to configure at least one processor in a base station for supporting location services for a user equipment (UE), the program code comprising instructions to: transmit a message to the UE to establish a Radio Resource Control (RRC) connection with the UE; receive a message from a location server requesting a connection suspension of the RRC connection between the base station and the UE while the UE is in a positioning session with the location server; determine to release the RRC connection at least partially based on the message from the location server requesting the connection suspension; and transmit a connection suspend message to put the UE in an inactive state, wherein the UE performs positioning measurements to obtain location information while in the inactive state and sends the location information, when in a connected state, to the location server.

Clause 113. The base station of clause 112, wherein the program code further comprises instructions to determine data activity scheduled for the UE while the UE performs positioning measurements, wherein the program code further comprises instructions to determine to release the RRC connection further in response to the data activity.

Clause 114. The base station of any of clauses 112-113, wherein the message from the location server requesting the connection suspension comprises a recommendation to suspend the RRC connection with the UE.

Clause 115. The base station of any of clauses 112-114, wherein the message from the location server requesting the connection suspension comprises an indication of a time duration during which position related messages between the UE and the location server are not expected.

Clause 116. The base station of clause 115, wherein the time duration during which the position related messages between the UE and the location server are not expected comprises a time for the UE to perform positioning measurements.

Clause 117. The base station of any of clauses 115-116, wherein the time duration during which the position related messages between the UE and the location server are not expected is based on a measurement periodicity.

Clause 118. The base station of any of clauses 115-117, wherein the position related messages between the UE and the location server that are not expected during the time duration comprise positioning measurement messages from the UE.

Clause 119. The base station of any of clauses 115-118, wherein the position related messages between the UE and the location server that are not expected during the time duration comprise positioning related requests from the location server.

Clause 120. The base station of any of clauses 115-119, wherein determining to release the RRC connection is at least partially based on the indication of the time duration.

Clause 121. The base station of any of clauses 112-120, wherein the program code further comprises instructions to: receive a connection resume request message from the UE when the UE is prepared to send the location information to the location server; and transmit a connection resume response message to the UE in response to the connection resume request message, wherein the UE transitions from the inactive state to the connected state and sends the location information to the location server.

Clause 122. The base station of any of clauses 112-121, wherein the program code further comprises instructions to: store a UE connection context while the UE is in the inactive state, wherein the UE stores the UE connection context while the UE is in the inactive state; and resume the RRC connection with the UE based on the UE connection context.

Clause 123. The base station of any of clauses 112-122, wherein the message from the location server requesting the connection suspension further comprises a recommendation to release the RRC connection to place the UE in an idle state based on a mobility state of the UE.

Clause 124. The base station of clause 123, wherein the base station releases the RRC connection between the base station and the UE to place the UE in the idle state when the UE is in a high mobility state and suspends the RRC connection between the base station and the UE to place the UE in the inactive state when the UE is in a low mobility state.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a user equipment (UE) for supporting location services for the UE, comprising:
   receiving a connection suspend message from a base station to place the UE in an inactive state while the UE is in a positioning session with a location server, wherein the base station has an established Radio Resource Control (RRC) connection with the UE, wherein the connection suspend message was initiated by the location server;
   performing positioning measurements to obtain location information while in the inactive state; and
   sending the location information, when in a connected state, to the location server,
   wherein the location server initiates the connection suspend message by providing to the base station an indication of a time duration during which position related messages between the UE and the location server are not expected.

2. The method of claim 1, further comprising:
   transmitting a connection resume request message to the base station when the location information is to be sent to the location server; and
   receiving a connection resume response message from the base station in response to the connection resume request message to transition from the inactive state to the connected state.

3. The method of claim 1, wherein the location server determines a time for performing the positioning measurements and initiates the connection suspend message at least partially based on the time for performing the positioning measurements.

4. The method of claim 1, wherein the time duration during which the position related messages between the UE and the location server are not expected comprises a time for the UE to perform the positioning measurements.

5. The method of claim 1, wherein the time duration during which the position related messages between the UE and the location server are not expected is based on a measurement periodicity.

6. The method of claim 1, wherein the position related messages between the UE and the location server that are not expected during the time duration comprise positioning measurement messages to the location server.

7. The method of claim 1, wherein the base station sends the connection suspend message based on the indication of the time duration.

8. The method of claim 1, further comprising:
   storing a UE connection context while in the inactive state, wherein the base station stores the UE connection context while the UE is in the inactive state; and
   resuming the RRC connection with the base station based on the UE connection context.

9. A user equipment (UE) configured for supporting location services for the UE, comprising:
   a wireless transceiver configured to wirelessly communicate with entities in a wireless network;
   at least one memory;
   at least one processor coupled to the wireless transceiver and the at least one memory, wherein the at least one processor is configured to:

transmit, via the wireless transceiver, a message to a base station to establish a Radio Resource Control (RRC) connection with the base station;
receive, via the wireless transceiver, a message for a positioning session from a location server;
receive, via the wireless transceiver, a connection suspend message from the base station to place the UE in an inactive state, wherein the connection suspend message was initiated by the location server;
perform positioning measurements to obtain location information while in the inactive state; and
send the location information, when in a connected state, to the location server;
wherein the location server initiates the connection suspend message by providing to the base station an indication of a time duration during which position related messages between the UE and the location server are not expected.

10. The UE of claim 9, wherein the at least one processor is further configured to:
transmit, via the wireless transceiver, a connection resume request message to the base station when the location information is to be sent to the location server; and
receive, via the wireless transceiver, a connection resume response message from the base station in response to the connection resume request message to transition from the inactive state to the connected state.

11. The UE of claim 9, wherein the location server determines a time for performing the positioning measurements and initiates the connection suspend message at least partially based on the time for performing the positioning measurements.

12. The UE of claim 9, wherein the time duration during which the position related messages between the UE and the location server are not expected comprises a time for the UE to perform the positioning measurements.

13. The UE of claim 9, wherein the time duration during which the position related messages between the UE and the location server are not expected is based on a measurement periodicity.

14. The UE of claim 9, wherein the position related messages between the UE and the location server that are not expected during the time duration comprise positioning measurement messages to the location server.

15. The UE of claim 9, wherein the base station sends the connection suspend message based on the indication of the time duration.

16. The UE of claim 9, wherein the at least one processor is further configured to:
store a UE connection context while in the inactive state, wherein the base station stores the UE connection context while the UE is in the inactive state; and
resume the RRC connection with the base station based on the UE connection context.

17. A user equipment (UE) configured for supporting location services for the UE, comprising:
means for transmitting a message to a base station to establish a Radio Resource Control (RRC) connection with the base station;
means for receiving a message for a positioning session from a location server;
means for receiving a connection suspend message from the base station to place the UE in an inactive state, wherein the connection suspend message was initiated by the location server;
means for performing positioning measurements to obtain location information while in the inactive state; and
means for sending the location information, when in a connected state, to the location server,
wherein the message to the base station to request the connection suspension comprises an indication of a time duration during which position related messages between the UE and the location server are not expected.

18. A method performed by a location server for supporting location services for a user equipment (UE), comprising:
sending a message to a base station that has an established Radio Resource Control (RRC) connection with the UE requesting a connection suspension for the UE to place the UE in an inactive state while the location server is in a positioning session with the UE, wherein the base station suspends the RRC connection between the base station and the UE in response to the message; and
receiving location information from the UE after the UE performs positioning measurements to obtain the location information and resumes the RRC connection with the base station,
wherein the message to the base station to request the connection suspension comprises an indication of a time duration during which position related messages between the UE and the location server are not expected.

19. The method of claim 18, wherein the message to the base station to request the connection suspension comprises a recommendation to suspend the RRC connection with the UE.

20. The method of claim 18, wherein the time duration during which the position related messages between the UE and the location server are not expected comprises a time for the UE to perform the positioning measurements.

21. The method of claim 18, wherein the time duration during which the position related messages between the UE and the location server are not expected is based on a measurement periodicity.

22. The method of claim 18, wherein the position related messages between the UE and the location server that are not expected during the time duration comprise positioning measurement messages from the UE.

23. The method of claim 18, wherein the position related messages between the UE and the location server that are not expected during the time duration comprise positioning related requests to the UE.

24. The method of claim 18, wherein the base station suspends the RRC connection between the base station and the UE based on the indication of the time duration.

25. The method of claim 18, wherein the UE transitions from a connected state to the inactive state in response to the base station suspending the RRC connection between the base station and the UE, wherein the UE stores a UE connection context while in the inactive state and the base station stores the UE connection context, and wherein the UE connection context is used to resume the RRC connection between the UE and the base station.

26. A method performed by a base station for supporting location services for a user equipment (UE), comprising:
receiving a message from a location server requesting a connection suspension of a Radio Resource Control (RRC) connection between the base station and the UE while the UE is in a positioning session with the location server;
determining whether to release the RRC connection at least partially based on the message from the location server requesting the connection suspension; and in response to determining to release the RRC connection, transmitting a connection suspend message to the UE to put the UE in an inactive state, wherein the UE performs positioning measurements to obtain location information while in the inactive state and sends the location information, when in a connected state, to the location server, wherein the message from the location server requesting the connection suspension comprises an indication of a time duration during which position related messages between the UE and the location server are not expected.

27. The method of claim 26, further comprising determining data activity scheduled for the UE while the UE performs positioning measurements, wherein determining to release the RRC connection is further in response to the data activity.

28. The method of claim 26, wherein the message from the location server requesting the connection suspension comprises a recommendation to suspend the RRC connection with the UE.

29. The method of claim 26, wherein the time duration during which the position related messages between the UE and the location server are not expected comprises a time for the UE to perform positioning measurements.

30. The method of claim 26, wherein the time duration during which the position related messages between the UE and the location server are not expected is based on a measurement periodicity.

31. The method of claim 26, wherein the position related messages between the UE and the location server that are not expected during the time duration comprise positioning measurement messages from the UE.

32. The method of claim 26, wherein the position related messages between the UE and the location server that are not expected during the time duration comprise positioning related requests from the location server.

33. The method of claim 26, wherein determining to release the RRC connection is at least partially based on the indication of the time duration.

34. The method of claim 26, further comprising:
receiving a connection resume request message from the UE when the UE is prepared to send the location information to the location server; and
transmitting a connection resume response message to the UE in response to the connection resume request message, wherein the UE transitions from the inactive state to the connected state and sends the location information to the location server.

35. The method of claim 26, further comprising:
storing a UE connection context while the UE is in the inactive state, wherein the UE stores the UE connection context while the UE is in the inactive state; and
resuming the RRC connection with the UE based on the UE connection context.

36. The method of claim 26, wherein the message from the location server requesting the connection suspension further comprises a recommendation to release the RRC connection to place the UE in an idle state based on a mobility state of the UE.

37. The method of claim 36, wherein the base station releases the RRC connection between the base station and the UE to place the UE in the idle state when the UE is in a high mobility state and suspends the RRC connection between the base station and the UE to place the UE in the inactive state when the UE is in a low mobility state.

* * * * *